United States Patent
Lin

(10) Patent No.: US 11,017,136 B1
(45) Date of Patent: May 25, 2021

(54) METHOD, SYSTEM, AND COMPUTER PROGRAM PRODUCT FOR CHARACTERIZING ELECTROMIGRATION EFFECTS IN AN ELECTRONIC DESIGN

(71) Applicant: Cadence Design Systems, Inc., San Jose, CA (US)

(72) Inventor: Qingyu Lin, Pleasanton, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/525,144

(22) Filed: Jul. 29, 2019

(51) Int. Cl.
*G06F 30/30* (2020.01)
*G06F 30/367* (2020.01)
*G06F 30/392* (2020.01)
*G06F 111/20* (2020.01)

(52) U.S. Cl.
CPC ............ *G06F 30/30* (2020.01); *G06F 30/367* (2020.01); *G06F 30/392* (2020.01); *G06F 2111/20* (2020.01)

(58) Field of Classification Search
CPC ...... G06F 30/30; G06F 30/367; G06F 30/392; G06F 2111/20
See application file for complete search history.

(56) References Cited

U.S. PATENT DOCUMENTS

| | | | | |
|---|---|---|---|---|
| 6,675,139 B1* | 1/2004 | Jetton | ..................... | G06F 30/39 703/17 |
| 6,868,374 B1* | 3/2005 | Ditlow | .................. | G06F 30/367 703/18 |
| 8,375,348 B1 | 2/2013 | Raj et al. | | |
| 9,785,141 B2 | 10/2017 | Tripathi et al. | | |
| 9,805,151 B1 | 10/2017 | Wen et al. | | |
| 9,881,120 B1 | 1/2018 | Ginetti et al. | | |
| 10,289,780 B1* | 5/2019 | Verma | ................... | G06F 30/367 |
| 10,423,744 B1 | 9/2019 | Phillips et al. | | |
| 2008/0222579 A1* | 9/2008 | Agarwal | ............... | G06F 30/367 716/136 |
| 2008/0246539 A1* | 10/2008 | Zadeh | .................. | H03H 11/483 327/558 |
| 2009/0013290 A1* | 1/2009 | Keinert | ................. | G06F 30/367 716/136 |
| 2009/0187869 A1* | 7/2009 | Jain | ........................ | G06F 30/367 716/115 |
| 2012/0254811 A1* | 10/2012 | Su | ......................... | G06F 30/367 716/52 |

(Continued)

OTHER PUBLICATIONS

"AC Circuit Analysis—Source with different frequencies", http://www.solved-problems.com/circuits/electrical-circuits-problems/ac-steady-state/1465/ac-circuit-analysis-different-frequencies/, Yaz, Apr. 23, 2015.*

(Continued)

*Primary Examiner* — Nha T Nguyen
(74) *Attorney, Agent, or Firm* — Vista IP Law Group, LLP

(57) ABSTRACT

Disclosed are methods, systems, and articles of manufacture for characterizing electromigration effects in an electronic design. These techniques determine an electrical characteristic at a port of a portion of an electronic design and select a number of frequencies in the frequency domain for the electrical characteristic. Multiple electric currents through a circuit component in the portion may be determined at least by performing a number of analyses for the number of frequencies. An electromigration effect may be characterized for the circuit component by using at least the multiple electric currents.

20 Claims, 16 Drawing Sheets

(56) References Cited

U.S. PATENT DOCUMENTS

| | | | | |
|---|---|---|---|---|
| 2013/0055184 A1* | 2/2013 | Shroff | ............... | G06F 30/398 |
| | | | | 716/112 |
| 2013/0212544 A1* | 8/2013 | Yu | ............... | G06F 30/398 |
| | | | | 716/55 |
| 2014/0223399 A1* | 8/2014 | Sato | ............... | G06F 30/398 |
| | | | | 716/109 |
| 2016/0116527 A1* | 4/2016 | Jain | ............... | G06F 30/367 |
| | | | | 702/58 |

* cited by examiner

METHOD, SYSTEM, AND COMPUTER PROGRAM PRODUCT FOR CHARACTERIZING ELECTROMIGRATION EFFECTS IN AN ELECTRONIC DESIGN

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The invention relates to technology for implementing and verifying an electronic design, such as the design of an integrated circuit ("IC"). Modern electronic design automation (EDA) tools are devised to communicate design intent and the circuit behavior between a circuit designer and other technical personnel such as design team member. With the number of transistors in an integrated circuit (IC) doubling approximately every two years according to the Moore's law, contemporary electronic designs have become increasingly bigger and more complex over time.

Circuit designers and verification engineers use different methods to verify circuit designs. One common method of verification is the use of simulation. Simulation dynamically verifies a design by monitoring behaviors of the design with respect to test stimuli. For many types of designs, simulation can and should be performed during the design process to ensure that the ultimate goals are achievable and will be realized by the finished product. The exploding demand for high performance electronic products has increased interest in efficient and accurate simulation techniques for integrated circuits. For analog designs, an analog-based simulation approach such as SPICE or SPICE-like simulations (e.g., FastSPICE, HSPICE, PSPICE, or any other SPICE-based or SPICE-compatible simulations) are commonly used to implement simulation of the design. For digital circuit, equivalent digital simulation is performed.

There are many types of electrical analyses that need to be performed to ensure the proper operation of an electronic design. For example, it is often desirable to analyze power distribution networks to check for potential problems relating to IR drops and/or electro-migration effects. Power distribution networks are used to distribute power and ground voltages from pad/package locations to circuit blocks in a design. With continuously shrinking device dimensions, faster switching frequencies and increasing power consumption in deep submicron technologies can cause large switching currents to flow in the power and ground networks, which degrade performance and reliability.

Due to the resistance of interconnects in the power networks, there is a voltage drop across the network, commonly referred to as IR drop. IR drop is a reduction in voltage that occurs on a power net (e.g., a $V_{DD}$ net) in integrated circuits. IC designs usually assume the availability of an ideal power supply that can instantly deliver any amount of current to maintain the specified voltage throughout the chip. In reality, however, a combination of increasing current per-unit area on the die and narrower metal line widths (which causes an increase in the power-grid resistance) causes localized voltage drops within the power grid, leading to decreased power supply voltage at cells and transistors. These localized drops in the power supply voltage decrease the local operating voltage of the chip, potentially causing timing problems and functional failures. IR drop may be both a local and global phenomena. IR drop can be local phenomenon when a number of cells in close proximity switch simultaneously, causing IR drop in that localized area. A higher power grid resistance to a specific portion of the chip can also cause localized IR drop. IR drop can be a global phenomenon when activity in one region of a chip causes effects in other regions. For example, one logic block may suffer from IR drop because of the current drawn by another nearby logic block.

The recent advances in very deep sub-micron (VDSM) integrated circuits (ICs) have brought new challenges in the physical design methodology process of integrated systems. In modern electronic circuits, geometries become smaller; clock frequencies increase; and on-chip interconnections gain increased importance in the prediction of performance. Nonetheless, it has been found that from 0.13 μm and bellow, ICs are more susceptible to wear-out over time (electromigration or EM), which requires some degree of built-in fault-tolerance and a careful design planning. Meanwhile, increased power demanded on ever shrunk chip size causes higher current densities within the power routing. High currents also induce EM effects in which metal lines begin to wear out during a chip's lifetime. Electro-migration (EM) is an effect on a circuit caused by movement of ions in a conductor structure, which over time will reduce the effective ability and reliability of the conductor to conduct current from one part of the circuit to another. Electromigration could significantly decrease the reliability of an IC, resulting in possible errors and failures in the IC product. With modern reductions in feature sizes made possible by improving manufacturing processes, the probability of failure due to electro-migration becomes much more possible due to increases of both the power density and the current density of wiring and power structures.

Conventional EM analyses require a first transient analysis on an RC network (R for resistor, and C for capacitor), which is often reduced, of an electronic design to determine electric currents at various nodes in the RC network. These nodal solutions in the form of waveforms are then provided to a circuit model with full or more complete parasitics; and a second transient analysis is performed to compute electric currents at various time points in a time window. Current densities through various circuit components may then be computed with respective electric currents and the cross-sectional geometries of these circuit components. Finally, the electromigration effects may be evaluated with these current densities to estimate the mean-time-to-failure by using, for example, one or more electromigration rules provided by a semiconductor foundry, the Black equation, any other suitable rules or requirements, or any combinations thereof, etc.

Nonetheless, these conventional approaches consume an unnecessary amount of computing resources due to the repeated transient analyses, especially during the second stage transient analysis on a model with full or more complete parasitics to compute the temporal variations of electric currents in the model. For example, to properly evaluate the electromigration effects through a circuit component, one may only need the maximum electric current or average electric current but not the electric current values at various time points that are used in a time-stepping mechanism of a transient analysis. Moreover, conventional approaches are limited to only the external ports, terminals, pins, or points (collectively ports for plural recitations and port for singular recitation) of an entire design but not ports interconnecting one layer to another layer within an electronic design.

Therefore, there is a need for an improved method and system for characterizing electromigration effects in an electronic design. It shall be noted that some of the approaches described in this Background section constitute approaches that may be pursued, but not necessarily approaches that have been previously conceived or pursued. Therefore, unless otherwise explicitly stated, it shall not be assumed that any of such approaches described in this section quality as prior art merely by virtue of their inclusion in this section.

SUMMARY

Disclosed are method(s), system(s), and article(s) of manufacture for characterizing electromigration effects in an electronic design in one or more embodiments. Some embodiments are directed at a method for characterizing electromigration effects in an electronic design.

In some embodiments, an electrical characteristic may be determined at a port of a portion of an electronic design and select a number of frequencies in the frequency domain for the electrical characteristic. Multiple electric currents through a circuit component in the portion may be determined at least by performing a number of analyses for the number of frequencies. An electromigration effect may be characterized for the circuit component by using at least the multiple electric currents.

Some embodiments are directed at a hardware system that may be invoked to perform any of the methods, processes, or sub-processes disclosed herein. The hardware system may include at least one microprocessor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
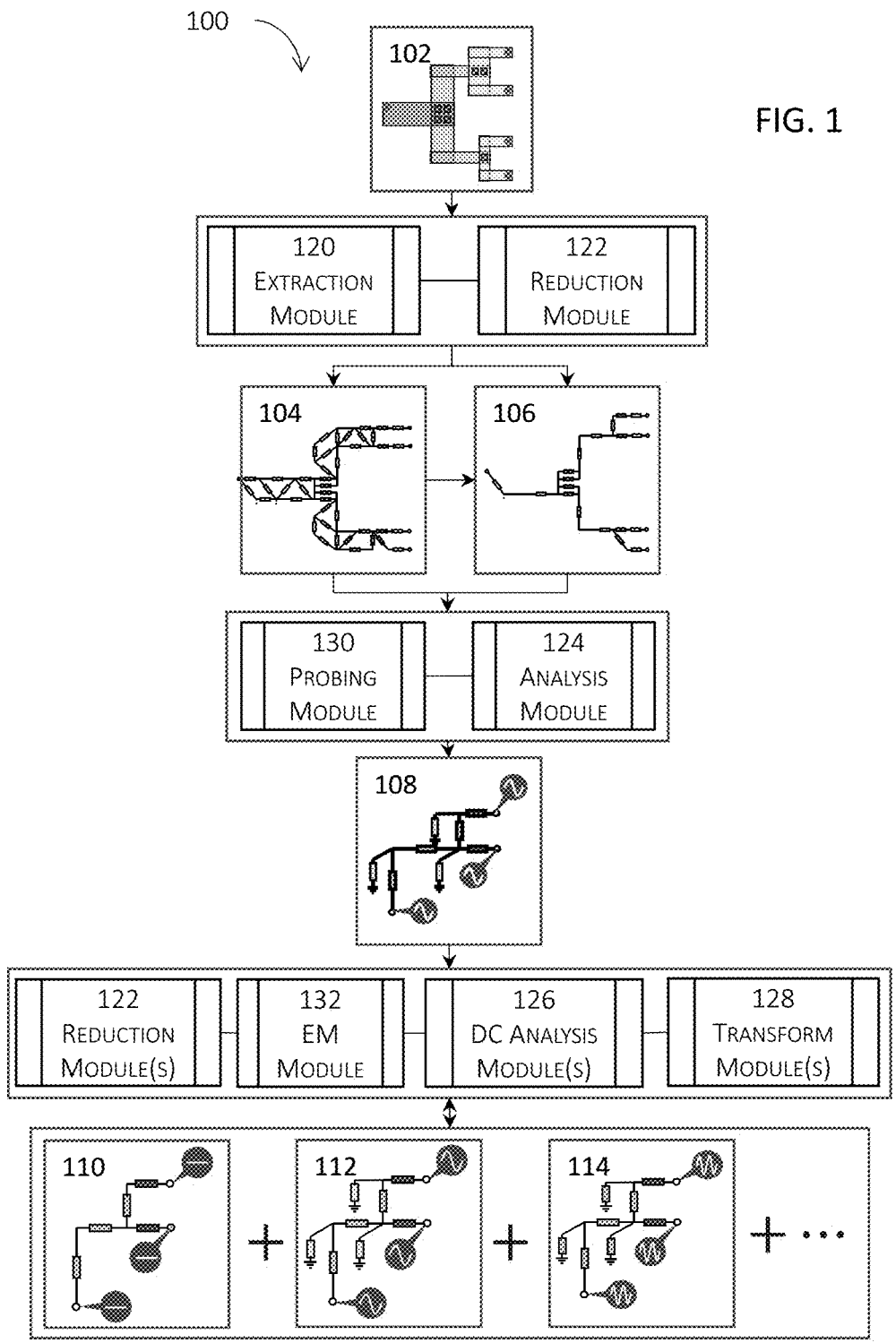
FIG. 1 illustrates a high-level block diagram of a simplified system for characterizing electromigration effects in an electronic design in one or more embodiments.

Various techniques are directed to characterizing electromigration effects in an electronic design in various embodiments. In these embodiments, the present invention determines a RC (or RLC) network for an entire electronic design or a portion thereof. Unlike conventional approaches that can only probe the outermost ports of an entire electronic design, the present invention can not only operate on an entire electronic design but also operate on a layer-by-layer basis by probing the ports along the boundaries of a layer (e.g., a metal-1 layer, metal-5 layer, etc.) The network may be optionally reduced by applying various RLC reduction techniques to the original network.

One of the advantages of applying an RLC reduction technique to reduce the network into a reduced network is that the overall size and hence nodes of the network is reduced and thus requires fewer computing resources to obtain nodal solutions (e.g., voltages, currents, etc.) at various nodes in the reduced network. A drawback of having a reduced network is that the accuracy of the nodal solutions may suffer because a reduced network only sufficiently mimics the original network but is not identical to the original network. Different reduction techniques reduce the same network to different sizes of reduced network due to their different aggressiveness. Therefore, whether to reduce the original network to a reduced network and which reduction technique to use may be determined on a balancing criterion between a performance requirement and a computing resource requirement.

The network (or the reduced network if reduction techniques are applied) may be provided to an analysis module that performs a first-stage transient analysis to obtain nodal voltage waveforms at various nodes of interest in the network (or reduced network) within a time window of interest (e.g., a time window in which voltage ramping up and/or ramping down occurs). These voltage waveforms may be determined by using a time-stepping mechanism within the time window during the first-stage transient analysis and are thus in the time domain. These time-domain voltage waveforms may then be transformed into the frequency domain by using, a Fourier-like transform. These transforms are described in greater details below with reference to FIG. 2B.

With the voltage waveforms transformed into the frequency domain, a number of frequencies may be selected based in part or in whole upon, for example, empirical rules, heuristics, statistical analysis results, etc. More selected frequencies lead to better accuracy at the expense of higher computing costs. For common electronic designs, a few frequencies to tens of frequencies (e.g., five, ten, twenty-five frequencies, etc.) usually provide reasonably accurate results with a reasonable amount of computing resources in some embodiments.

Because the electronic design will now be analyzed in the frequency domain, without requiring or performing any transient analyses in the time domain. Therefore, the amplitude of a voltage waveform carries more significance than its phase. As a result, a capacitor in the network may be replaced with an equivalent impedance to further simplified the network (or reduced network) into a simplified network. For each of the selected frequencies, the same capacitor may correspond to a different impedance.

With the simplified network determined, voltage sources with respective amplitudes corresponding to the selected frequency are applied to the network. A DC (direct current) analysis may be quickly performed on the simplified network (by replacing a capacitor with an equivalent impedance) to compute the electric currents, without performing any transient analyses in the time domain or solving the conductance matrix for electric currents. The present invention then repeats the same for the remaining selected frequencies to determine the respective electric currents.

For each node or a branch in the simplified network, the respective electric currents corresponding to the selected frequencies are added together to approximate the electric current at the node or through the branch. The geometries of the cross-sectional area of a circuit component of interest may be looked up (e.g., from a technology file or the design specification) or extracted from the electronic design. The current density may then be determined and used to evaluate the electromigration effects for the circuit component of interest.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention.

FIG. 1 illustrates a high-level block diagram of a simplified system 100 for characterizing electromigration effects in an electronic design in one or more embodiments. An entire electronic design or a portion thereof (102) may be provided to an extraction module (120) that automatically extracts a network 104 (e.g., an RC network, an RLC network, etc.) of the electronic design by using, for example, the random walk theory. This extracted network 104 may be optionally provided to a reduction module 122 that applies one or more reduction techniques to the network 104 to generate a reduced network 106. As described above, a reduced network requires fewer computing resources to compute the nodal solutions (e.g., voltage waveforms at various nodes of interest within a time window) at the expense of some loss in accuracy in the nodal solutions because a reduced network is not entirely identical to the original network. Also, different reduction techniques reduce the same network to different sizes of reduced network due to their different aggressiveness. Therefore, whether to reduce the original network to a reduced network and which reduction technique to use may be determined on a balancing criterion between a performance requirement and a computing resource requirement.

The network 104 (or the reduced network 106) may then be provided to a probing module 130 that probes one or more points or nodes of interest for which solutions are desired. The network 104 (or the reduced network 106) may also be provided to an analysis module 124 that performs one or more transient analyses to determine the solutions 108 (e.g., voltage waveforms) for the aforementioned one or more points or nodes of interest in the network 104 (or the reduced network 106).

It shall be noted that a reduced network may be used in determining the nodal solutions by the one or more transient analyses (first-stage analysis) because the first-stage analysis is to provide nodal solutions as the initial and/or boundary conditions for the second-stage analysis that determines the electric currents that are further used to compute current density for EM characterizations. To more accurately capture the electric currents, the network used in the second-stage analysis may need at least some parasitics. Therefore, a reduced network used in the first-stage analysis or any other reduced networks may or may not be used in the second-stage analysis, depending on how the network is reduced for the one or more first-stage, transient analyses. In one or more embodiments, a full RC-network may be used in the second-stage analysis. In some other embodiments, a reduced RC-network that is obtained by using any circuit reduction techniques may be used in the second-stage analysis.

These nodal solutions 108 may be transformed from the time domain into the frequency domain by one or more transform modules 128. For example, a transform module 128 may perform a Fourier transform (FT), a discrete Fourier transform (DFT), or a discrete-time Fourier transform (DTFT) to transform the voltage waveforms in to time domain to the frequency domain.

A number of frequencies may be selected based in part or in whole upon the significance of an impact of the frequencies after the transformation from the time domain. In some embodiments, larger frequencies may be selected due to their higher impacts on the electronic circuit. For example, the largest five, ten, twenty-three frequencies, etc. may be selected for the transformed nodal solutions (e.g., voltages). In some other embodiments, an initial frequency and periodic frequency increments may be selected as the number of frequencies. A larger total number of frequencies selected will provide a more accurate solution at the expense of computing resources. Therefore, the selection of frequencies may be based at least in part upon a balancing criterion between a performance requirement and a computing resource requirement.

Because the second-stage analyses will be performed in the frequency domain, and further because most EM characterizations are concerned with the maximum, minimum, or average current densities, it is the amplitude of a frequency domain voltage that carries more significance than the phase for EM characterization. Therefore, a circuit component that may exhibit transient behaviors (e.g., a capacitor) may be replaced with its equivalent impedance. Therefore, the network 104 (or the reduced network 106) may be simplified into a simplified network by a reduction module 122 that replaces such a circuit component with its equivalent impedance. In one embodiment, a simplified network has a pure resistance network without any capacitors or inductors. In this embodiment, the capacitors and inductors in the original network are replaced by their respective equivalent impedances.

As described above, the amplitude of a waveform is more significant than the phase of the waveform for EM characterizations that primarily consider the maximum, average, and/or the minimum electric currents, rather than their temporal variations. As a result, the network is simplified as described above. Moreover, the voltage sources for each of the selected frequencies may be applied to the simplified network (110, 112, and 114); and the simplified network with these voltage sources may be further provided to a DC analysis module that performs a DC analysis to determine the corresponding electric currents in the simplified network for each of the selected frequencies.

Once all the electric currents have been determined for each of the selected frequencies, the electric currents for one circuit component may be added for the circuit component to approximate the total current through the circuit component. The current density may then be computed by using the cross-sectional geometries of the circuit component for characterizing the EM effects. Because the present invention only involves DC analyses in the second stage without performing or requiring any transient analyses in some embodiments, the present invention thus provides a more efficient, expedient solution with at least equal accuracy than conventional approaches.

Figure 2A:
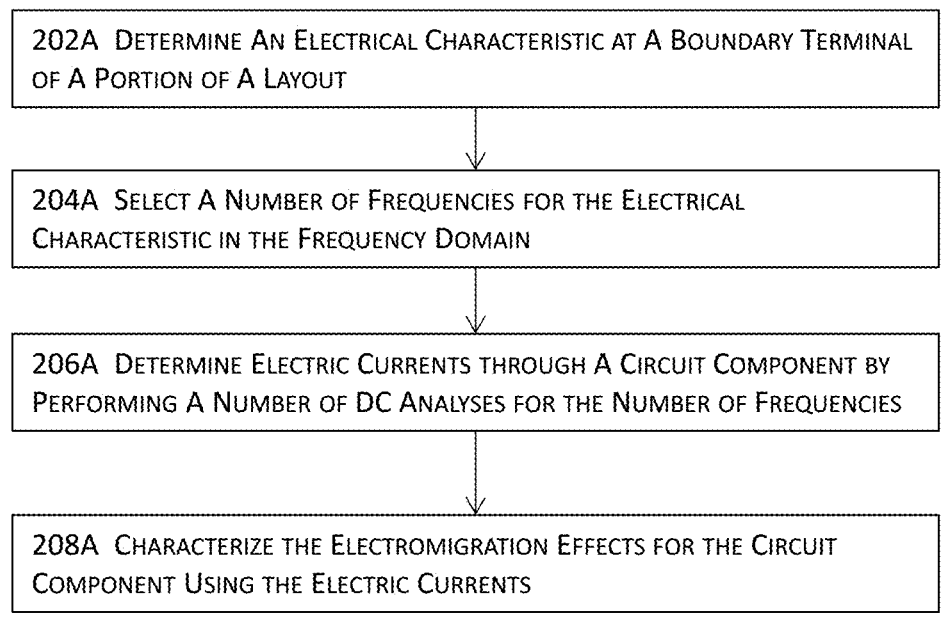
FIG. 2A illustrates a high-level block diagram for characterizing electromigration effects in an electronic design in one or more embodiments.

FIG. 2A illustrates a high-level block diagram for characterizing electromigration effects in an electronic design in one or more embodiments. More specifically, an electrical characteristic may be determined at 202A for a boundary port of at least a portion of an electronic design (e.g., a layout, a schematic, etc.) Unlike conventional approaches that can only probe the ports along the external boundaries of an entire electronic design, these embodiments can probe any ports along the external boundaries of a portion of an external design.

For example, these embodiments can probe ports along the boundaries of a layer in an electronic design as well as ports along the external boundaries of the entire electronic design. More details about determining an electrical characteristic at 202A will be described in greater details below with reference to 3A. Moreover, the electrical characteristic determined may include, for example, a voltage waveform in the time domain in some embodiments. In these embodiments, the voltage waveform may be obtained by performing a transient analysis on a model of the electronic design within a selected time window of interest.

A number of frequencies may be selected at 204A for the electrical characteristic. In some embodiments where the electrical characteristic is determined in the time domain, the electrical characteristic may be first transformed into the frequency domain by using, for example, a Fourier transform. More details about transforming signals between the time domain and the frequency domain is described below with reference to FIG. 2B; and more details about selecting frequencies at 204A will also be described below in greater details with reference to FIG. 3B.

With the number of frequencies selected at 204A, the electric currents corresponding to selected frequencies may be determined at 206A for a circuit component in the electronic design. In these embodiments, the electric currents may be determined with DC analyses, rather than performing or requiring any transient analyses or solving a conductance matrix, by applying the voltage sources that correspond to each of the selected frequencies. More details about determining electric currents will be described below with reference to FIG. 3C.

The electromigration effects may then be characterized at 208A using at least the electric currents determined at 206A. For example, with the electric currents determined for each of the selected number of frequencies, the total electric current may be approximated with these individual electric currents. The current density may then be computed with the geometries of the cross-sectional area of a circuit component and may be further used in characterizing the electromigration effects. More details about characterizing electromigration effects will be described below with reference to FIG. 3D.

Figure 2B:
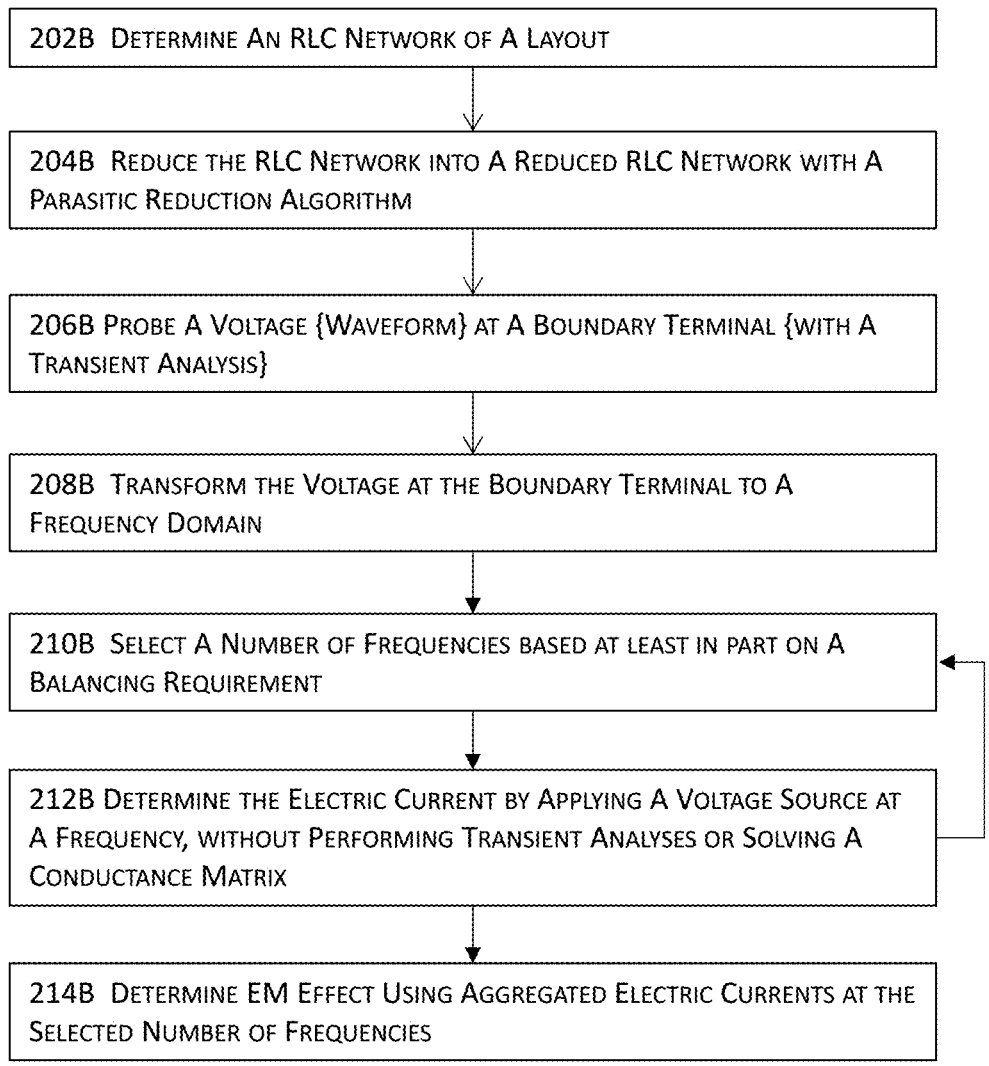
FIG. 2B illustrates a more detailed block diagram for characterizing electromigration effects in an electronic design in one or more embodiments.

FIG. 2B illustrates a more detailed block diagram for characterizing electromigration effects in an electronic design in one or more embodiments. In these one or more embodiments, a network such as an RC network or RLC network may be determined at 202B for an electronic design of interest. The network may be determined at 202B by, for example, performing an extraction on the electronic design.

The network determined at 202B may be optionally reduced at 204B into a reduced network by applying one or more circuit reduction techniques to the network. As described above, a reduced network requires less computing resource yet produces less accurate electrical behaviors than a non-reduced network because the more the reduction is the farther away a reduced network deviates from the original, non-reduced network. Therefore, applying circuit reduction to the network determined at 204B is entirely optional.

A transient analysis may be performed at 206B to probe a boundary port of at least a portion of the electronic design for the voltage waveform at the port. Unlike conventional approaches that must probe the boundary ports of the outermost external ports of the entire electronic design, these embodiments may probe the boundary ports along the boundaries of a layer as well as the outermost external ports of the entire electronic design. Moreover, unlike some conventional approaches that probe these ports for electric currents, these embodiments probe an external boundary port for a voltage.

One of the advantages of probing a port for voltage, instead of electric current, is that in the second-stage analysis, these embodiments may apply the corresponding voltage sources as boundary conditions to the network to obtain the electric currents. In contrast, conventional approaches that probe for electric currents during the first stage apply the current sources to the network for the second stage analysis and are thus required to solve the conductance matrix that not only requires a large memory footprint but also multiple iterations and are thus resource consuming.

The voltage obtained at 206B includes a temporal distribution of voltage values (e.g., a voltage waveform in a selected time window). This voltage may be transformed at 208B into the frequency domain by using, for example, a Fourier or Fourier-like transform (e.g., discrete Fourier transform, discrete-time Fourier transform, etc.) With these transformations of the determined voltages, these embodiments lift the solution domain into the frequency domain so that further transient analyses or solutions of the conductance matrix may be entirely avoided.

Returning back to FIG. 2B where the voltage determined at 206B has been transformed into the frequency domain. A number of frequencies may be selected at 210B based at least in part upon a balancing requirement. More specifically, because the problem is not transformed from the common time domain into the frequency domain in order to rid the requirement or performance of additional transient analyses or solutions of the conductance matrix, the number of frequencies selected impacts the accuracy of the solutions. More selected frequencies result in more accurate results to approximate the original voltage waveform yet require more computing resource and more analyses (and thus more processor cycles). For example, an electric current, I(t), may be approximated with the following Taylor expansion (or any other similar expansion):

$$I(t) \cong I_0 + I_1 e^{-i \cdot 2\pi f_{min} \cdot t} + I_2 e^{-i \cdot 2\pi (f_{min} + \Delta f) \cdot t} + I_3 e^{-i \cdot 2\pi (f_{min} + 2\Delta f) \cdot t} + \ldots, \quad 0 < t < T \quad (9)$$

In the above expression (9), periodic frequency values at a constant $\Delta f$ are selected to approximate the electric current, I(t). Therefore, more terms (and hence more selected frequencies) result in a more accurate approximation of the electric current, I(t). Each of the terms on the right-hand side may be determined with a selected frequency by applying the voltage sources as boundary conditions to the circuit network and solving for the corresponding electric current. On the other hand, more selected frequencies require more analyses to obtain the corresponding electric currents. Therefore, the number of frequencies may be selected at 210B based at least in part upon a balancing requirement between performance (e.g., runtime, processor cycles, memory utilization, etc.) and accuracy of the results.

For each frequency of the number of frequencies selected at 210B, the corresponding electric currents at various circuit components being probed (e.g., a boundary port) or through the respective branches corresponding to the circuit components being probed in the network may be determined at 212B by applying the voltage sources corresponding to the selected frequency to the network as boundary conditions and performing an analysis to determine the corresponding electric currents.

In some embodiments, the EM characterization task may be further simplified by replacing a capacitor (that exhibit transient behaviors during charging and discharging) with an equivalent impedance. It shall be noted that the same capacitor may be represented as different equivalent impedances at different frequencies. Therefore, an equivalent impedance may be required for each of the selected number of frequencies. As described above, it is the amplitude, not the phase, of a waveform that carries more significance in EM characterizations that are concerned more with the maximum, average, and/or minimum electric currents, rather than the temporal variations of electric currents. Therefore, replacing a capacitor with an equivalent impedance provides more than sufficient accuracy for EM characterization purposes, without performing or requiring the resource- and time-consuming transient analyses or solving the conductance matrix.

With the capacitor replaced with an equivalent impedance, a DC analysis may be performed at 212B on the network with the voltage sources with the amplitudes corresponding to a specific selected frequency applied to the network as boundary conditions. The DC analysis solves the network for the electric currents in the network at 212B. Once all the electric currents have been determined for all the selected frequencies, these electric currents for a particular circuit component (e.g., a boundary port along the boundary of a layer) or a corresponding branch in the electronic circuit may be aggregated to produce the aggregated electric current through the circuit component. The geometries of the cross-section of the circuit component or any interconnects connected to the circuit component may be used with the aggregated electric current to determine the current density. EM effects may thus be determined at 214B by using the current density for the circuit component (or any interconnects connected to the circuit component being probed in the network).

Figure 3A:
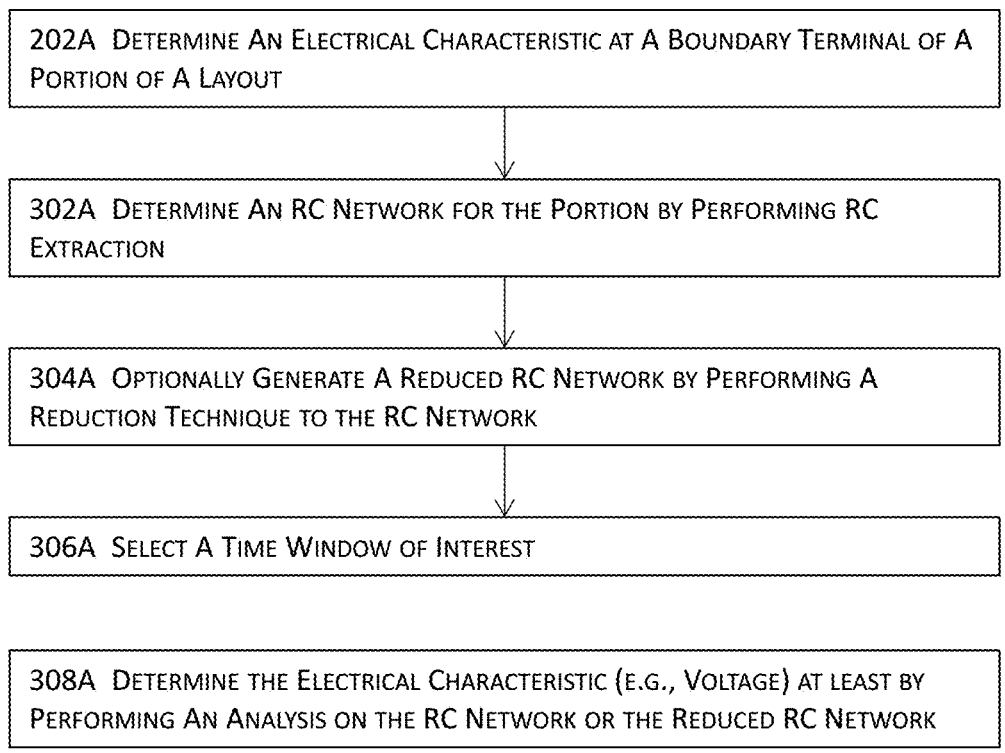
FIGS. 3A-3D illustrate more details about a portion of the high-level block diagram illustrated in FIG. 2A in one or more embodiments.

FIGS. 3A-3D illustrate more details about a portion of the high-level block diagram illustrated in FIG. 2A in one or more embodiments. More specifically, FIG. 3A illustrates more details about determining a voltage at 202A of FIG. 2. In some embodiments, an RC network may be determined at 302A for the portion of the electronic design by, for example, performing RC extraction on a layout. It shall be noted that an RLC network, rather than an RC network, may be determined at 302A because the next first-stage analysis includes a transient analysis that captures the transient behaviors of the network. Therefore, any circuit components exhibiting transient behaviors may be captured in this network. Nonetheless, for the ease of explanations and description, the specification will use the terms "RC network" and "RLC network" (R for resistor, L for inductor, and C for capacitor) interchangeably throughout the entire description.

This RC network determined at 302A may be optionally reduced at 304B into a reduced RC network by performing one or more circuit reduction techniques to the original network from extraction. As described above, a reduced network requires fewer computing resources to compute the nodal solutions (e.g., voltage waveforms at various nodes of interest within a time window) at the expense of some loss in accuracy in the nodal solutions because a reduced network is not entirely identical to the original network. Also, different reduction techniques reduce the same network to different sizes of reduced network due to their different aggressiveness. Therefore, reducing the original network into a reduced network is entirely optional; and the reduction technique to be used (should reduction be applied) may be determined on a balancing criterion between a performance requirement and a computing resource requirement.

A time window of interest may be selected or identified at 306A. A time window may be selected based at least in part upon whether a particular time period involves transient behaviors or more transient behaviors such as ramping down, ramping up, switching, etc. On the other hand, a time period during which not much transient behaviors occur may or may not be selected because each time period will be discretized into a set of time points (for time-stepping transient analyses), and each time point requires computing resources for analysis.

The voltage may then be determined at 308A for the selected time window at least by performing an analysis on the RC network or the reduced RC network. In some embodiments, the analysis includes a transient analysis and produces a voltage waveform for the selected time window. This voltage determined at 202A needs to be further processed because one of the objectives of the present invention is to rid the requirement or performance, to the extent possible, of transient analyses or any solution processes that involve a conductance matrix. More details will be described immediately below with reference to FIG. 3B.

Figure 3B:
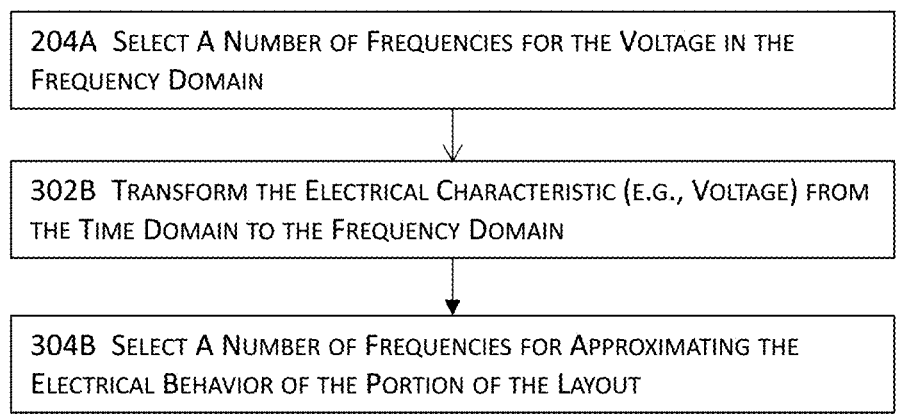

FIG. 3B illustrated more details about the processes pertaining to the selection of frequencies at 204A of FIG. 3B. In some embodiments, the voltage determined at 202A may be transformed from the time domain to the frequency domain by using, for example, a Fourier transform, a discrete Fourier transform, a discrete-time Fourier transform, or any other qualified transforms (e.g., Laplace transform), etc. As described immediately above, one of the objectives of the present invention is to rid the requirement or performance of transient analyses or any solution processes that involve a conductance matrix. Remaining in the time domain may lead to further performance of transient analyses in the time domain. Therefore, these embodiments switch to the frequency for the second-stage analyses by first transforming the first-stage analysis results (e.g., the voltage determined at 202A) into the frequency domain at 302B.

The following paragraphs provide some basics for some example Fourier and inverse Fourier transforms that may be used in some embodiments of the present invention. A signal may be completely described in a time domain or in a frequency domain. One representation in one domain may be transformed into the other domain because the representations in both domains are equivalent. Such transformations may be carried out with, for example, the Fourier transformation and inverse Fourier transformation as provided below, although it shall be noted that other transforms (e.g., Laplace transforms) may also be used.

$$X(\omega) = \int_{t=-\infty}^{\infty} x(t) \cdot e^{-j\omega t} dt \qquad (1)$$

$$x(t) = \frac{1}{2\pi} \int_{\omega=-\infty}^{\infty} X(\omega) \cdot e^{j\omega t} d\omega \qquad (2)$$

where $x(t): -\infty < t < \infty$; and $X(\omega): -\infty < \omega < \infty$

Equation (1) above denotes the Fourier transform from the time domain to the frequency domain; and equation (2) above denotes the inverse Fourier transform from the frequency domain to the time domain. For a continuous system to a finite extent, the following Fourier series (equation (3)) and inverse Fourier series (equation (4)) may be used.

$$X[k] = \frac{1}{T} \int_{t=0}^{T} x(t) \cdot e^{-jk\omega_0 t} dt \qquad (3)$$

-continued $$x(t) = \int_{k=-\infty}^{\infty} X[k] \cdot e^{jk\omega_0 t} d\omega \qquad (4)$$

where for $x(t)$ of duration $T$, $\omega_0 = \frac{2\pi}{T}$;

$x(t): 0 \le t \le T; X[k]: k = \ldots, -2, -1, 0, 1, 2, \ldots$

In a continuous system (e.g., an analog or mixed-signal system), the aforementioned Fourier and inverse Fourier transforms may be used in describing such a system to an infinite extent (or a Fourier series and inverse Fourier series for describing such a system to a finite extent). In a discrete system to a finite extent, a discrete Fourier transform and the corresponding inverse discrete Fourier transform respectively represented as equation (5) and equation (6) below may be used to perform transformations between the time domain and the frequency domain:

$$X(\omega) = \sum_{n=0}^{N-1} x[n] \cdot e^{-jk\omega_0 n}, \qquad (5)$$

$$x[n] = \frac{1}{N} \sum_{k=0}^{N-1} X[k] \cdot e^{jk\omega_0 n}, \qquad (6)$$

where for $x[n]$ of duration $N$, $\omega_0 = \frac{2\pi}{T}$;

$x[n]: n = 0, 1, 2, \ldots, N-1; X[k]: k = 0, 1, \ldots, N-1;$

In a continuous system to an infinite extent, a discrete-time Fourier transform and the corresponding inverse discrete-time Fourier transform respectively represented as equation (7) and equation (8) below may be used to perform transformations between the time domain and the frequency domain:

$$X(\omega) = \sum_{n=-\infty}^{\infty} x[n] \cdot e^{-j\omega n}, \qquad (7)$$

$$x[n] = \frac{1}{2\pi} \int_{\omega=-\pi}^{\pi} X[\omega] \cdot e^{j\omega n} d\omega, \qquad (8)$$

where $x[n]: n = \ldots, -2, -1, 0, 1, 2, \ldots$;

$X(\omega): -\pi \le \omega \le \pi,$

In the equations above, the first equations (e.g., equations (1), (3), (5), and (7)) includes the transform X on the left-hand side and either a sum or integral involving the original signal x on the right-hand side. The first equations thus give the expressions for the transforms in terms of the original signal. For each frequency, these expressions $X(\omega)$ (or $X[k]$) indicate how much of this frequency $\omega$ (or $k\omega_0$) is included in the original signal x. These first equations are thus often termed as the Fourier transform or Fourier series (depending on whether an infinite state or a finite state is involved).

The second equations above (e.g., equations (2), (4), (6), and (8)) includes the original signal x on the left-hand side and either a sum or integral on the left-hand side. These second equations thus indicate how to recover a signal if the frequency content of the signal is known. These second equations are thus often termed as the inverse Fourier transform or series (depending on whether an infinite state or a finite state is involved). It shall be noted that the signals above may also take on complex values by, for example, expressing a complex value in terms of its magnitude and phase (e.g., $X(\omega)=Ae^{j\varnothing}$,
where A denotes the magnitude, and Ø denotes the phase.

Figure 3C:
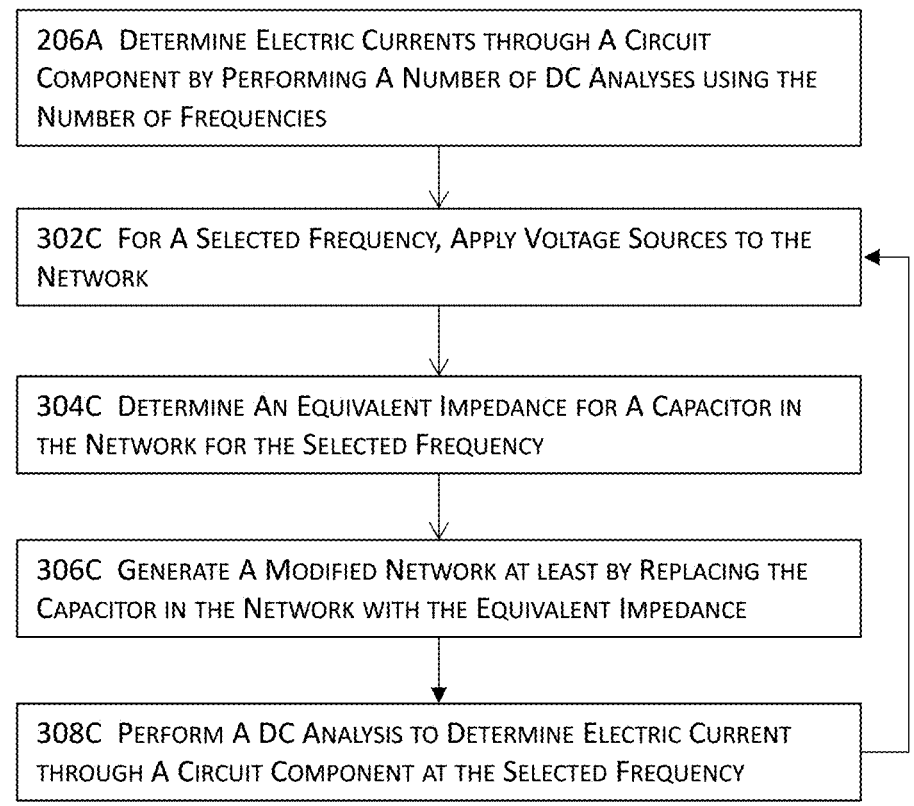

FIG. 3C illustrates more details about determining electric currents through a circuit component at 206A of FIG. 2. In some embodiments, the voltages corresponding to a frequency selected at 204A may be applied at 302C to a network of the electronic design. This network may be the original network extracted from the layout of the electronic design in some embodiments or a reduced network that includes at least some parasitics in some other embodiments. Furthermore, the voltage sources corresponding to a selected frequency may be applied to the network as boundary conditions to prepare the network for the second-stage analysis.

As described above, one of the objectives of the present invention is to rid the requirement or performance, to the extent possible, of transient analyses or any solution processes that involve a conductance matrix. To achieve this objective, some embodiments determine an equivalent impedance $$\left(\text{e.g., } \frac{1}{Z} = j\omega C, \omega = 2\pi f\right)$$

for a capacitor in the network at 304C because, as described above, the amplitude of a waveform is more significant than the phase of the waveform in characterization of electromigration effects. It shall be noted that the same capacitor may correspond to different equivalent impedances at different frequencies. Therefore, an equivalent impedance may be determined at 304C for a capacitor for each of the frequencies selected at 204A. If the network includes an inductor, this inductor may be treated as an impedance, or an equivalent impedance may be determined for the inductor $$\left(\text{e.g., } \frac{1}{Z} = \frac{1}{j\omega L}, \omega = 2\pi f\right).$$

The network may thus be modified at 306C into a simplified network at least by replacing the capacitor with the equivalent impedance determined at 304C. In some embodiments, all the capacitors (and inductors in some of these embodiments) in the network may be replaced with their respective equivalent impedances at 306C to produce the simplified network. With the simplified network, a DC analysis may be performed at 308C with the voltage sources as boundary conditions to determine the electric currents at various circuit components being probed (e.g., boundary ports along the boundaries of a layer and/or the entire electronic design). The same process repeats for each of the remaining selected frequencies to obtain the corresponding electric currents.

Figure 3D:
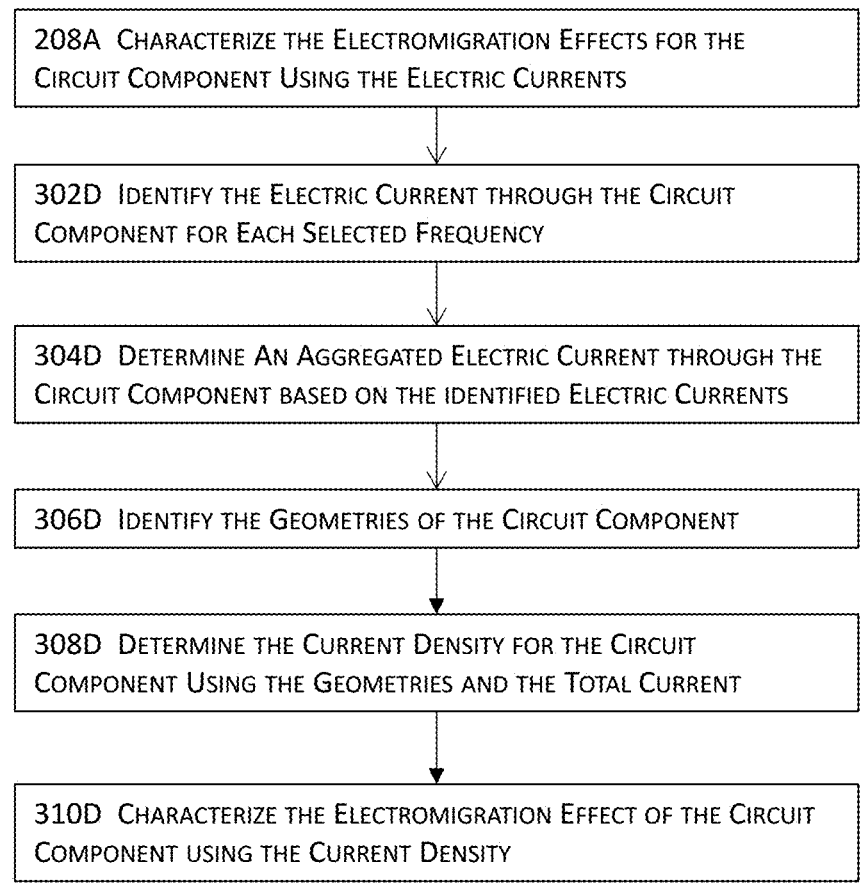

FIG. 3D illustrates more details about characterizing EM effects for a circuit component described in 208A in FIG. 2A. In some embodiments, the electric currents through the circuit component may be identified at 302D for each of the selected frequencies. For example, the voltage sources with respective amplitudes corresponding to a selected frequency may be applied to the network; and a DC analysis may be performed on the network with the voltage sources with respective amplitudes as boundary conditions. The DC analysis produces electric currents in the network in response to the applied voltage sources with respective amplitudes corresponding to the selected frequency.

Once the corresponding electric currents for all the selected frequencies are determined, an aggregated electric current (e.g., a total electric current) through a circuit component may be determined by aggregating the respective electric currents corresponding to each of the selected frequencies at 304D by using the concept described above with respect to expression (9). With the total current through a circuit component determined at 304D, the geometries of the circuit component are needed to compute the current density through the circuit component. Therefore, the geometries of the circuit component may be identified at 306D from, for example, the technology file, the design specification, or a 3D layout, etc.

The current density through the circuit component may then be determined at 308D by dividing the aggregated electric current by the cross-section area of the circuit component. With the electric current density determined, the electromigration effects may be characterized at 310D by using, for example, the black equation:

$$\text{MTTF}=A\times(J^{-n})\times\exp(E_a/kT), \tag{1}$$

In the Black's equation, MTTF denotes the mean-time-to-failure; A denotes a constant based on the cross-sectional area of the interconnect; J denotes the electric current density through the circuit component; $E_a$ denotes the activation energy for the material of the interconnect; k denotes the Boltzmann's constant; T denotes temperature; and n denotes a scaling factor that may be set to 2 in some embodiments. The EM requirement may specify, for example, the required or desired mean-time-to-m failure, the maximum current density, etc. in some embodiments.

Figure 4:
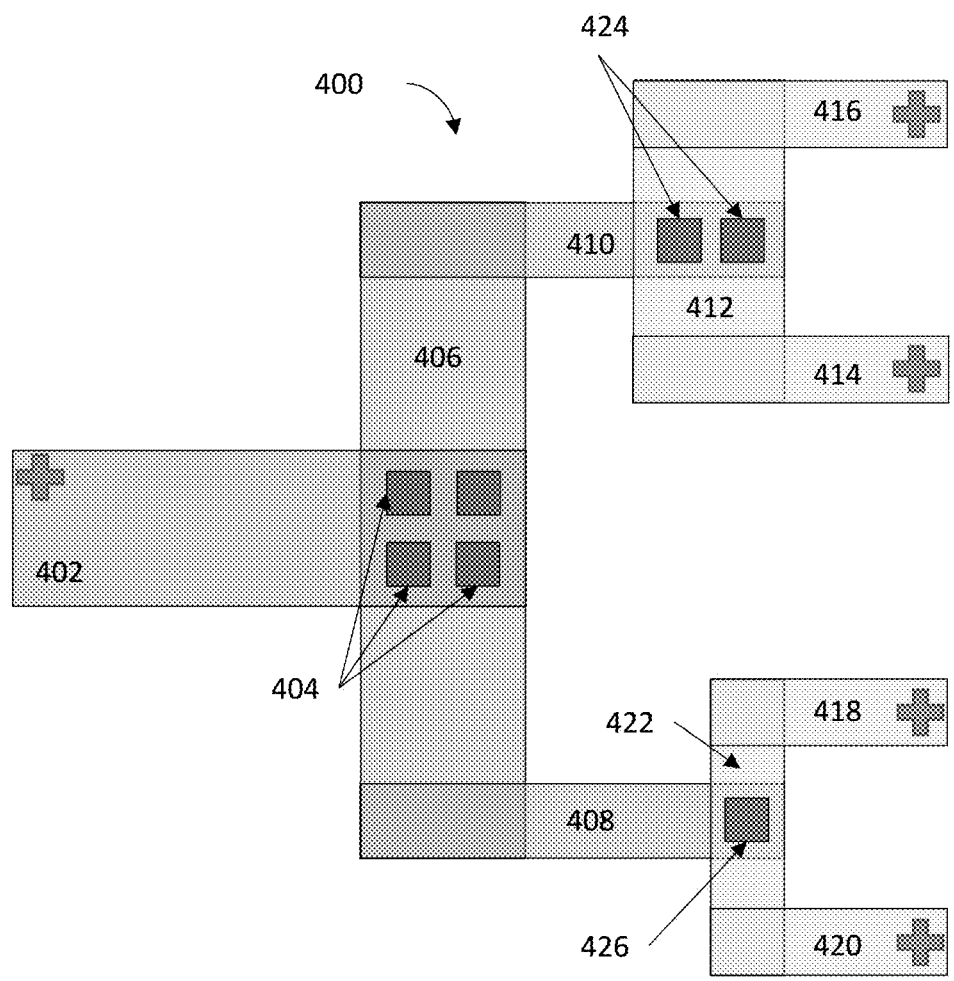
FIG. 4 illustrates a simple example of a portion of an electronic design to which various techniques for characterizing electromigration effects may be applied in one or more embodiments.

FIG. 4 illustrates a simple example of a portion 400 of an electronic design to which various techniques for characterizing electromigration effects may be applied in one or more embodiments. For the ease of description and illustration, this example portion 400 includes shape 402 in a first layer as well as shapes 406, 408, and 410 in the second layer that is interconnected to the first layer through vias 404 (four instances).

This example portion 400 further includes the first group of shapes 412, 414, and 416 and the second group of shapes 418, 420, and 422 on the third layer that is interconnected to the second layer through vias 424 (two instances for the first group) and via 426 (one instance for the second group). As described earlier, conventional approaches only work with the entire electronic design and can probe only the ports along the outermost boundary of the entire electronic design, whereas some embodiments described herein can probe ports or points along the boundary of a layer and apply voltage sources with respective amplitudes corresponding to selected frequencies to these ports to determine electric currents therein.

Figure 5A:
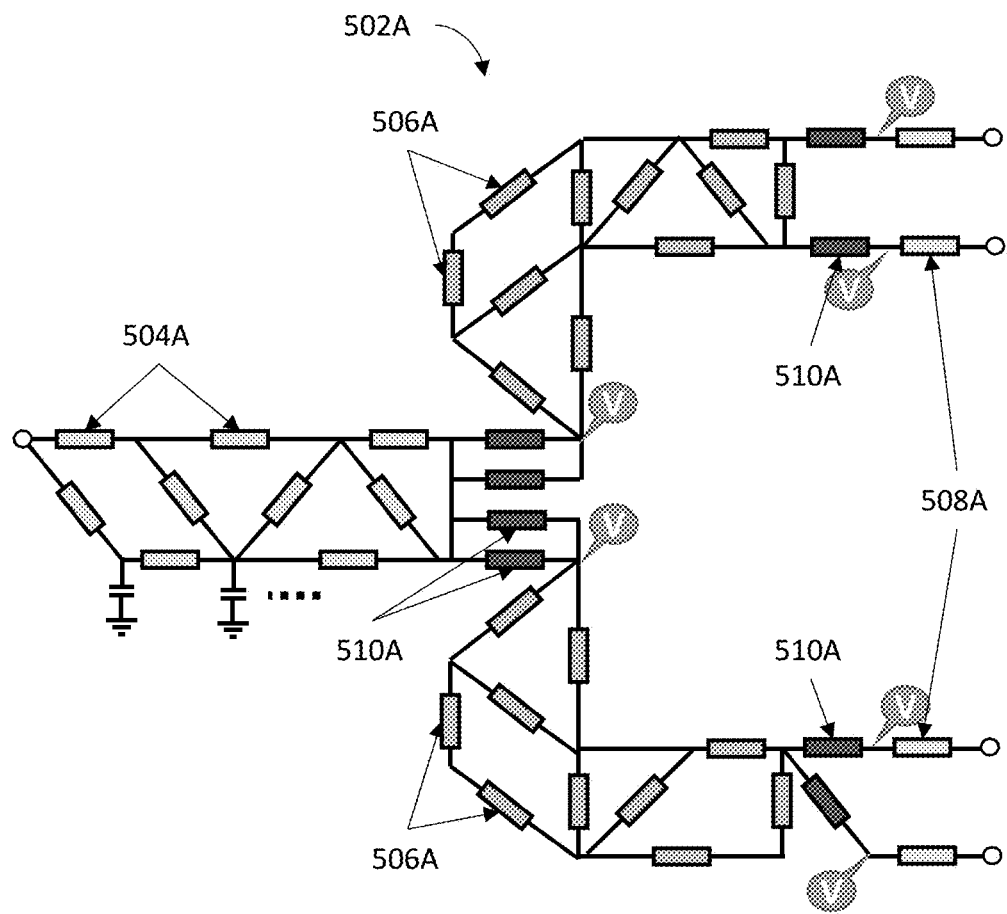
FIG. 5A illustrates an example of an RC network for the example portion of an electronic design illustrated in FIG. 4 in one or more embodiments.

FIG. 5A illustrates an example of an RC network for the example portion of an electronic design illustrated in FIG. 4 in one or more embodiments. More particularly, the RC network 502A illustrated in FIG. 5A includes various circuit components (e.g., resistors and capacitors) for each layer.

For example, circuit components 504A represent the circuit components 402 in the first layer; circuit components 506A represent the circuit components (406, 408, and 410) in the second layer; circuit components 510A represent the vias 404 connecting the first layer and the second layer; circuit components 508A represent the circuit components (412, 414, 416, 418, 420, and 422) in the third layer; and circuit component 510A represent the vias 424 and 426 interconnecting the third layer and the second layer.

Figure 5B:
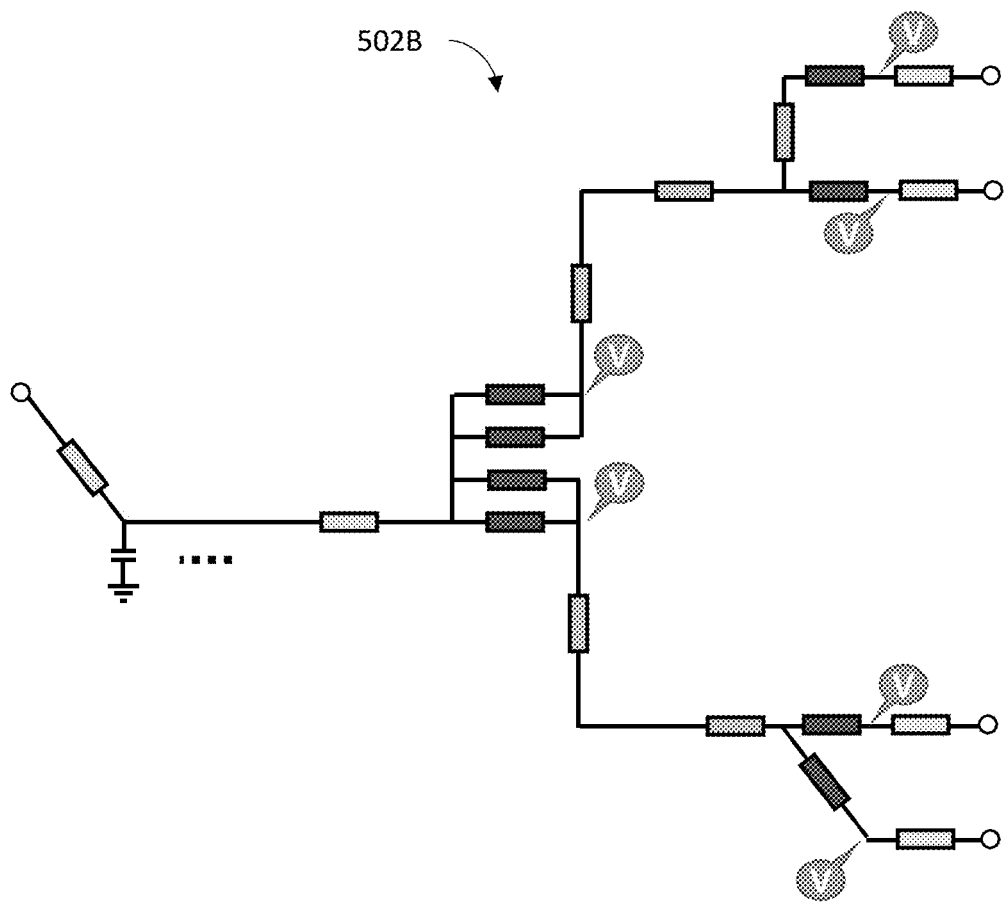
FIG. 5B illustrates an example of a reduced RC network for the example RC network illustrated in FIG. 5A in one or more embodiments.

FIG. 5B illustrates an example of a reduced RC network 502B for the example RC network illustrated in FIG. 5A in one or more embodiments. This reduced RC network 502B may be obtained by applying any circuit reduction techniques to the original network 502A. As described above, either the original RC network 502A or the reduced RC network 502B may be provided to an analysis module for a first stage transient analysis. The original RC network 502A requires more computing resources (e.g., longer analysis time, larger memory footprint, etc.) while producing more accurate results; and the reduced RC network 502B requires fewer computing resources (e.g., shorter analysis time and smaller memory footprint) at the expense of accuracy. Some embodiments described herein probe various points or ports of interest for voltages during the first stage analysis.

Figure 6A:
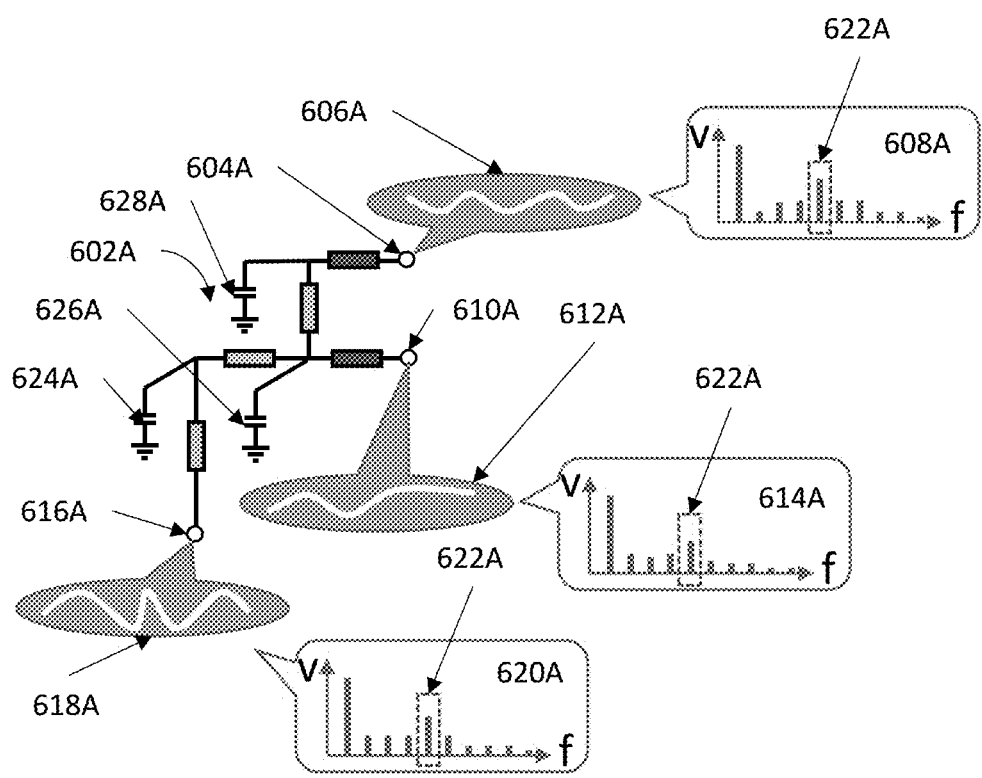
FIG. 6A illustrates a simplified example of transforming time domain voltages to the frequency domain within a selected time window of interest in one or more embodiments.

FIG. 6A illustrates a simplified example of transforming time domain voltages to the frequency domain within a selected time window of interest in one or more embodiments. In this example, an RC network (e.g., 502A in FIG. 5A) or a reduced RC network (e.g., 502B in FIG. 5B) is provided to an analysis module to obtain the first-stage transient analysis results—voltage waveforms (606A, 612A, and 618A) at the ports (604A, 610A, and 616A) along the boundaries of one or more layers of an electronic design. It shall be noted that the RC network (or reduced RC network) still includes the circuit components (e.g., capacitors) exhibiting transient behaviors.

As described above, the voltage waveforms 606A, 612A, and 618A are respectively transformed into the frequency domain with the corresponding frequency domain expressions 608A, 614A, and 620A. A number of frequencies is then selected for the second-stage analyses—DC analyses. FIG. 6A illustrates an example of selecting the most significant frequency 622A (e.g., the largest N frequencies) from a plurality of frequencies. Each of these frequencies will be separately processed to determine the electric currents in the network 602A as will be described in more details below with reference to FIGS. 6B-6C.

Figure 6B:
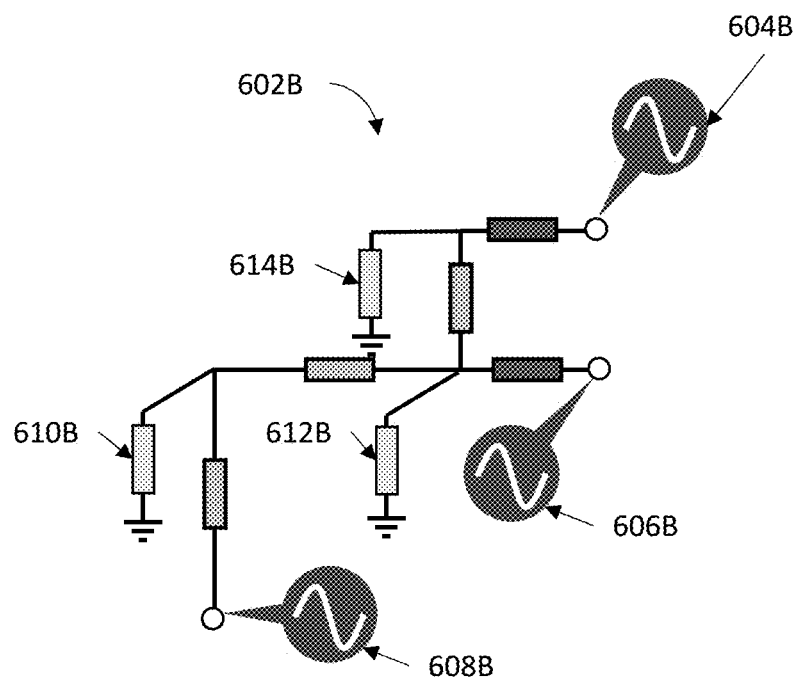
FIG. 6B illustrates a simplified example of applying voltage sources in the frequency domain on an example reduced network for the reduced RC network illustrated in FIG. 6A in one or more embodiments.

FIG. 6B illustrates a simplified example of applying voltage sources in the frequency domain on an example reduced network for the reduced RC network illustrated in FIG. 6A in one or more embodiments. More particularly, the example illustrated in FIG. 6B shows that the network 602B is further simplified by replacing the capacitors 624A, 626A, and 628A with their respective equivalent impedances 610B, 612B, and 614B, respectively. This replacement does not significantly impact the EM characterization results because EM characterizations are more concerned with the maximum, the average, and/or the minimum electric currents (and hence the maximum, average, and/or minimum current densities), rather than with the phases of these circuit component behaviors. It shall be noted that for the same capacitor (e.g., 624A, 626A, or 628A), an equivalent impedance may be determined for each of the number of selected frequencies.

The example in FIG. 6B further illustrates that for each selected frequency, the voltage sources (604B, 606B, and 608B) with respective amplitudes corresponding to the selected frequency are respectively applied to the corresponding ports. These corresponding voltage sources with respective amplitudes will serve as initial and/or boundary conditions in the second stage analyses. Because the circuit components (e.g., capacitors 624A, 626A, and 628A) have been replaced with impedances, the second-stage analyses may include a DC analysis for each of the selected frequencies. The network 602B with the voltage sources having respective amplitudes will be provided to a DC analysis module which then solves the network 602B for electric currents therein.

Figure 6C:
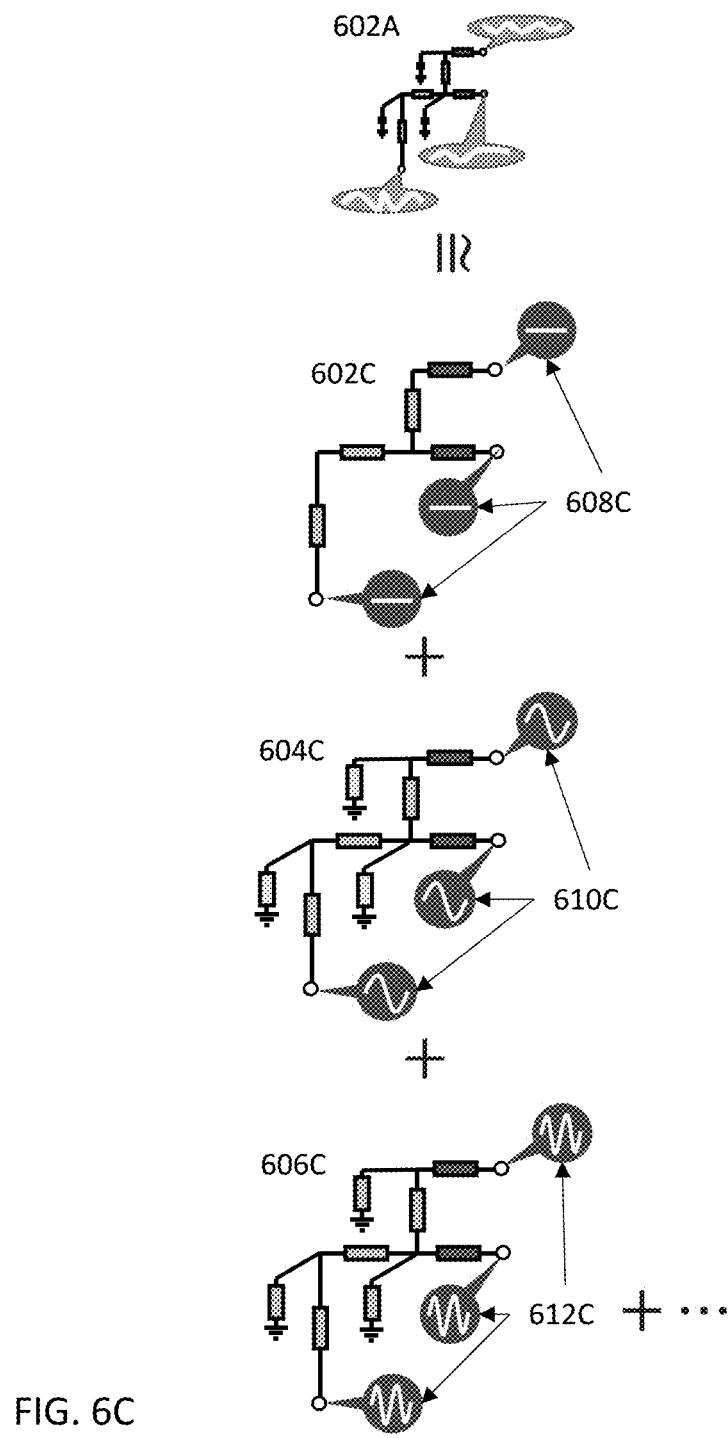
FIG. 6C illustrates a simplified example of determining the electric currents in the reduced network with the voltage sources illustrated in FIG. 6B in one or more embodiments.

FIG. 6C illustrates a simplified example of determining the electric currents in the reduced network with the voltage sources illustrated in FIG. 6B in one or more embodiments. More particularly, FIG. 6C illustrates the example where the voltage sources with respective amplitudes corresponding to each of the selected frequencies are applied to the network that is then provided to a DC analysis module to solve for the electric currents therein with a DC analysis, without performing or requiring any transient analyses or solving the conductance matrix.

For example, the voltage sources 608C having respective amplitudes corresponding to a first selected frequency are applied to the network; and this circuit model 602C is provided to a DC analysis module to solve for the first electric currents corresponding to the first selected frequency. Similarly, the voltage sources 610C having respective amplitudes corresponding to a second selected frequency are applied to the network; and this circuit model 604C is provided to a DC analysis module to solve for the second electric currents corresponding to the second selected frequency; and the voltage sources 612C with respective amplitudes corresponding to a third selected frequency are applied to the network; and this circuit model 606C is provided to a DC analysis module to solve for the third electric currents corresponding to the third selected frequency. If there are more selected frequencies remaining, each of the remaining frequencies will be similarly processed to obtain the corresponding electric currents.

FIG. 6C further illustrates how to aggregate individual electric currents for each selected frequency to approximate the electric currents in the network. In this example, an electric current in the network may be expressed as a simple Taylor expansion: $I(t) \cong I_0 + I_1 e^{-i \cdot 2\pi f_{min} \cdot t} + I_2 e^{-i \cdot 2\pi (f_{min} + \Delta f) \cdot t} + I_3 e^{-i \cdot 2\pi (f_{min} + 2\Delta f) \cdot t} + \ldots$, $0 < t < T$, where a period selection of frequencies starting from $f_{min}$ at the increment of $\Delta f$ is used for the ease of illustration and description, although other expansions or approximations may also be used.

In this example illustrated in FIG. 6C, the electric current in the network 602A may be approximated by the sum of the first electric currents with the voltage sources 608C with respective amplitudes corresponding to the first selected frequency in 602C, the second electric currents with the voltage sources 610C with respective amplitudes corresponding to the second selected frequency in 604C, the third electric currents with the voltage sources 612C with respective amplitudes corresponding to the third selected frequency in 606C, and so on and so forth. With the aggregated electric currents in the network 602A, the current densities may be obtained by dividing the electric currents by the corresponding cross-sectional areas of circuit components of interest. The current densities may then be provided to an EM characterization module which evaluates the EM effects under the Black equation for the circuit components of interest.

Figure 7:
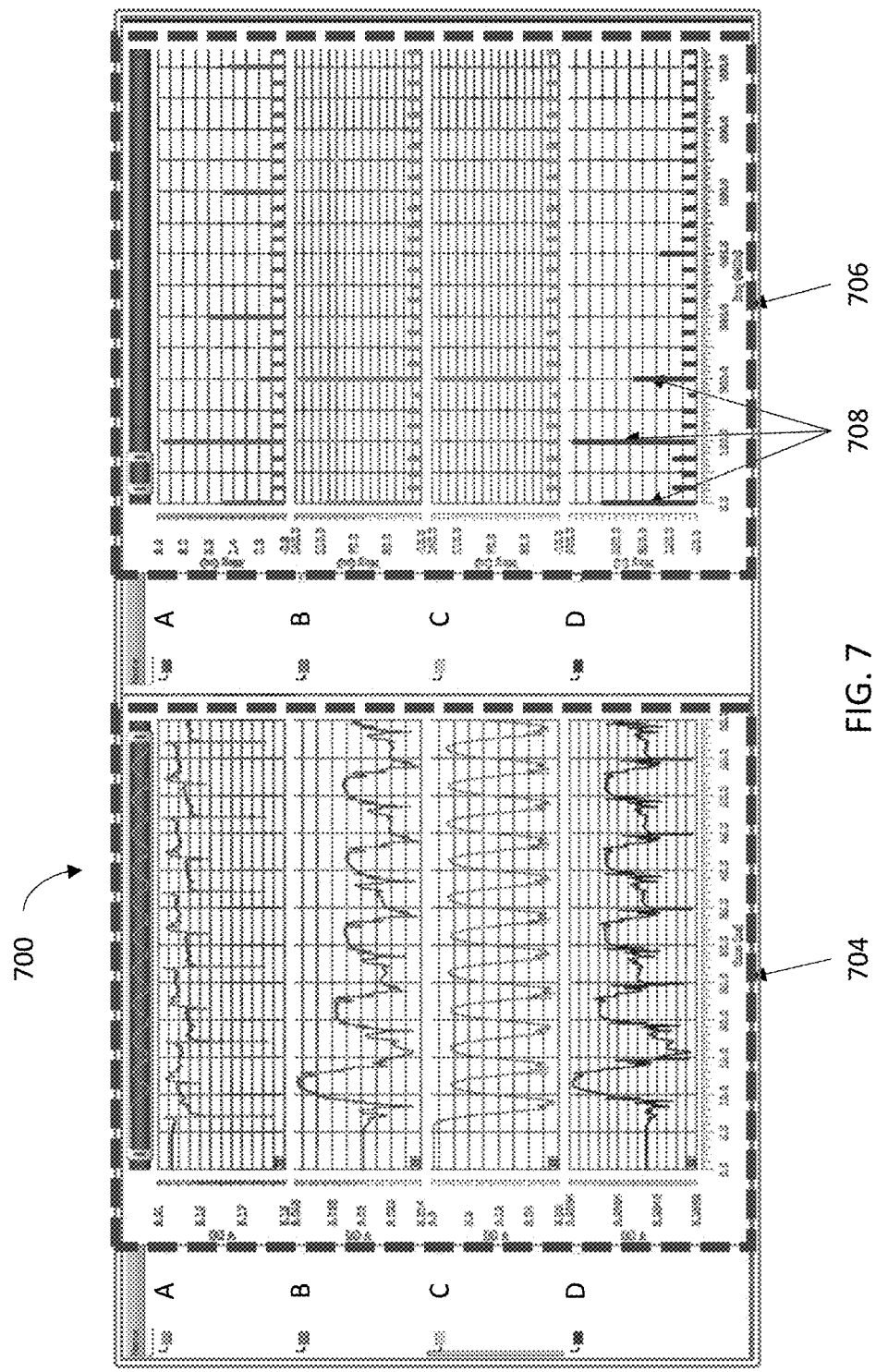
FIG. 7 illustrates a working example of transforming voltage waveforms in the time domain to the frequency domain in one or more embodiments.

FIG. 7 illustrates a working example of transforming voltage waveforms in the time domain to the frequency domain in one or more embodiments. As shown FIG. 7, the voltage waveforms 704 in the time domain are transformed into the corresponding expressions in the frequency domain 706; and each voltage in the frequency domain includes a number of more significant frequencies (e.g., 708). These more significant frequencies may be selected for the second-stage analysis as described above. The original network for an example electronic design includes about seven hundred and forty thousand (740,000) nodes with about one million and seven hundred thousand (1,700,000) capacitors and nine hundred and ten thousand (910,000) resistors. The simplified network includes about ninety-three thousand (93,000) nodes with about one hundred and twenty-seven thousand (127,000) resistors. A benchmark testing with state-of-the-art simulator used over three hours to obtain at the first-stage solution and over two hours to obtain the second-stage solution. An application of some techniques described herein to the second stage analysis of the same electronic design utilized not even 7.3 seconds for each DC analysis at the second stage with 20 selected frequencies. The electric currents at the same branches in the electronic design obtained with these techniques described herein are within 2% from those obtained on the state-of-the-art simulator. These preliminary results demonstrate that these techniques described herein provide nearly equal accuracy while consuming much less computing resource in terms of, for example, processor cycles, memory footprint, etc.

Figure 8:
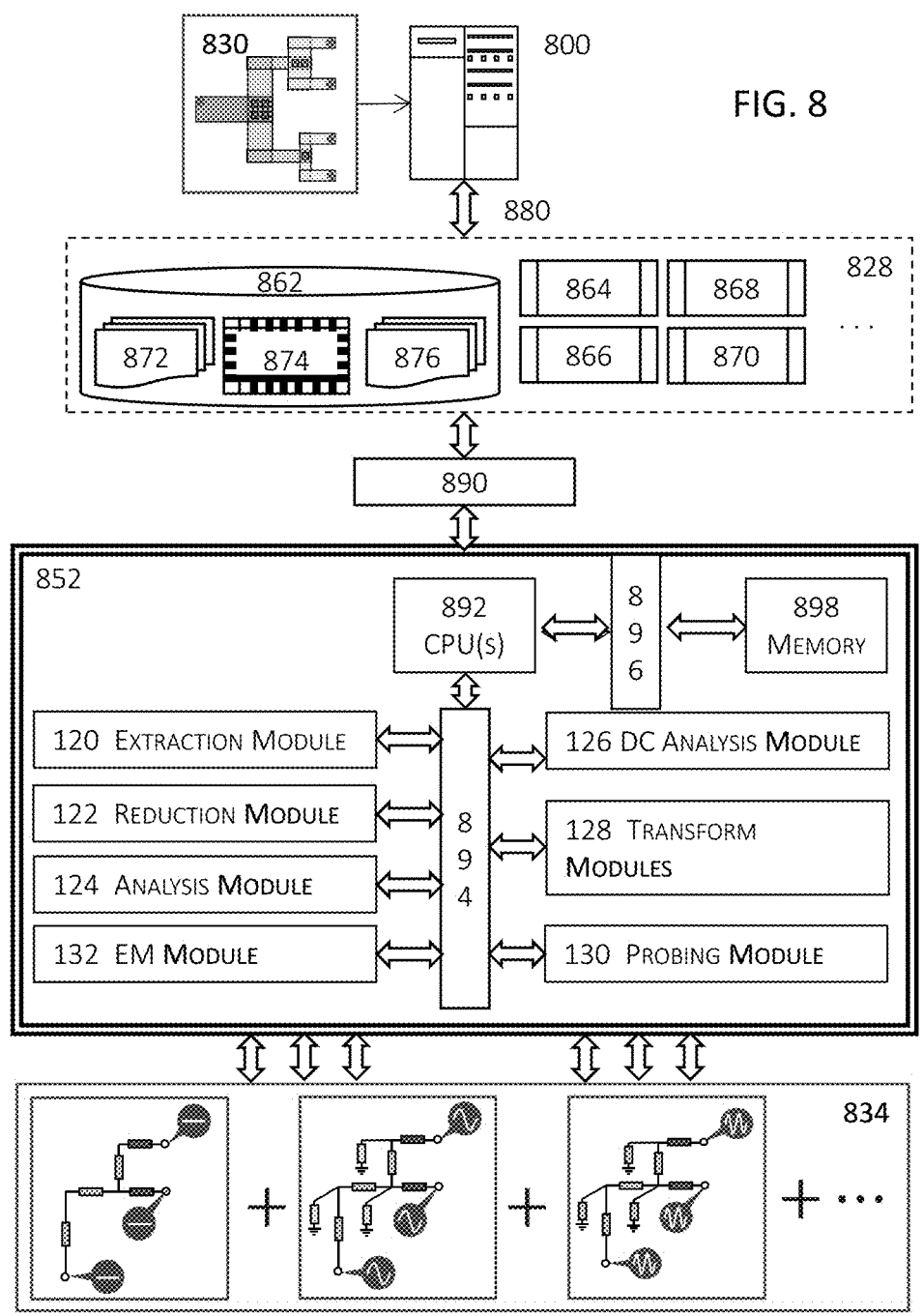
FIG. 8 illustrates an example computing system that may be used in characterizing electromigration effects in an electronic design in one or more embodiments.

FIG. 8 illustrates an example computing system that characterizes electromigration effects in an electronic design in one or more embodiments. More specifically, the computing system 800 in FIG. 8 may comprise one or more computing systems 800, such as a general-purpose computer described in the System Architecture Overview section to implement one or more special proposes. The illustrative system in FIG. 8 may include an Internet-based computing platform providing a shared pool of configurable computer processing resources (e.g., computer networks, servers, storage, applications, services, etc.) and data to other computers and devices in a ubiquitous, on-demand basis via the Internet. For example, one or more computing resources and/or modules illustrated in FIG. 8 may be located in a cloud computing platform in some embodiments.

In this illustrated system in FIG. 8, one or more computing systems 800 may invoke and execute various modules to identify an electronic design 830 (e.g., an entire layout including multiple metal layers, a layer of an electronic design, etc.). The one or more computing systems 800 may invoke and execute a plurality of modules, which are specifically programmed and stored at least partially in memory of and functions in conjunction with at least one microprocessor (e.g., 892) or processor core of the one or more computing systems 800, to perform various functions to transform the identified electronic design 830 into a simplified electronic design 832.

For example, the one or more computing systems may execute an extraction module (120) that extracts an RC or RLC network of an electronic design by using, for example, the random walk theory. The one or more computing systems may also execute one or more reduction modules (122) to reduce the extracted network into a reduced network by applying one or more reduction techniques. This network or reduced network may be provided to an analysis module (124) that perform one or more transient analyses on the network (or the optionally reduced network) to generate, for example, voltage waveforms in the time domain.

A transform module (128) may be invoked or executed to transform the voltage waveforms generated by the analysis module (124) from the time domain to the frequency domain. With the transformed voltages, the network (or the optionally reduced network) may be further simplified into a simplified network by the reduction module (122) that replaces one or more capacitors with one or more equivalent impedances.

A number of frequencies are selected. A frequency may be selected when the frequency exhibits more significant impact on the electrical behaviors of the electronic design. In some embodiments, the largest N frequencies (having the largest amplitude) may be selected. For each selected frequency, voltage sources with respective amplitudes corresponding to each frequency may be applied to the aforementioned simplified network which is then analyzed by a DC (direct current) analysis module (126) to determine the electric currents in the simplified network. The DC analysis module (126) then repeats the analysis for the remaining selected frequencies to generate corresponding electric currents in the simplified network.

For a circuit component of interest, the electric currents (834) corresponding to the selected frequencies are added to generate an approximate electric current through the circuit component of interest. The geometries of the cross-sectional area of a circuit component of interest may be looked up (e.g., from a technology file or the design specification) or extracted from the electronic design. The current density may then be determined and used to evaluate the electromigration (EM) effects for the circuit component of interest based on, for example, the Black equation.

The electric currents and/or the EM effects (834) may be further provided to one or more EDA (electronic design automation) tools to implement, modify, optimize, perform sign-off and design closure. The present invention may provide a final version (e.g., a signed-off version) of the electronic design as an input to the manufacturing or fabrication equipment (e.g., photomask manufacturing equipment, lithographic equipment, etc.) so as to cause the manufacturing of the underlying electronic circuits to occur.

The present invention provides a more efficient and more accurate solution to address at least the shortcomings and problems with conventional approaches. More particularly, the present invention no longer requires the performance of the time- and resource-consuming transient analyses to determine the electric currents for computing the current densities for EM characterization. Moreover, the present invention, unlike conventional approaches, can probe the external ports of a layer of an electronic design as well as the overall external ports of an entire electronic design.

In some embodiments, the one or more computing systems 800 may invoke various system resources such as the processor(s) or processor core(s), memory, disks, etc. The one or more computing systems 800 may also initiate or interact with other computing systems to access, via a computer bus architecture (e.g., a system bus, a control bus, a data bus, or any combinations thereof), various resources 828 that may comprise a floorplanner, a global routing engine, and/or a detail routing engine 864, a layout editor 866, a design rule checker 868, a verification engine 870, etc.

These various resources 828 may further include, for example, one or more other EDA (electronic design automation) modules such as a schematic tool, a placement tool, a routing tool, verification tools, post-route or post-layout optimization tools, various photolithography tools (e.g., optical proximity correction or OPC tools, phase shift mask or PSM tools, resolution enhancement technology or RET tools, etc.), etc. to prepare the electronic design. Once sign-off and/or design closure is achieved, the electronic design (e.g., a modified version of 830 based in whole or in part upon the results 834) is finalized for tapeout; and the electronic design is transmitted to mask fabrication equipment for mask preparation and mask writing to produce photomasks that are then used in the actual manufacturing of the electronic circuits 834 represented by the electronic design.

The one or more computing systems 800 may further write to and read from a local or remote (e.g., networked storage device(s)) non-transitory computer accessible storage 862 that stores thereupon data or information such as, but not limited to, one or more databases (874) such as schematic design database(s) or physical design database(s), electronic circuit design specification database(s), techfiles for multiple design fabrics, various statistics, various data, rule decks, various design rules, constraints, etc. (872), or other information or data (876) that may be used to facilitate the performance of various functions to achieve the intended purposes. The one or more databases may also include, for example, one or more data structures for facilitating clustering, flattening, simplification, etc. in electronic designs.

In some embodiments, the computing system 800 may include the various resources 828 such that these various resources may be invoked from within the computing system via a network or a computer bus 880 (e.g., an internet session, an intranet session, a data bus interfacing a microprocessor 892 and the non-transitory computer accessible storage medium 898 or a system bus 890 between a microprocessor 892 and one or more engines in the various resources 828). In some other embodiments, some or all of these various resources may be located remotely from the computing system 800 such that the computing system may access the some or all of these resources via a computer bus 880 and one or more network components.

The computing system may also include one or more modules in the set of modules 852. One or more modules in the set 852 may include or at least function in conjunction with a microprocessor 892 via a computer bus 894 to access or invoke various modules in 852 (e.g., 120, 122, 124, 126, 128, 130, and 132 described above) in some embodiments. In these embodiments, a single microprocessor 892 may be included in and thus shared among more than one module even when the computing system 800 includes only one microprocessor 892. A microprocessor 892 may further access some non-transitory memory 898 (e.g., random access memory or RAM) via a system bus 896 to read and/or write data during the microprocessor's execution of processes.

The set of modules 852 may also include one or more extraction modules to identify various data or information such as the schematic connectivity from a schematic design, physical design connectivity from a hierarchical physical design, parasitics from a hierarchical physical design, and/or hierarchy information from a hierarchical schematic design and/or a hierarchical physical design. The set of modules 852 may further optionally include one or more signoff modules (not shown) to perform various signoff and design closure tasks to ensure that the electronic design implemented by various techniques described herein may be successfully fabricated while maintaining various performance, cost, reliability, and manufacturability requirements.

For example, the one or more signoff modules may include one or more timing signoff modules to perform timing analyses and timing closure related tasks (e.g., silicon-accurate timing signoff, signal integrity analyses, etc.) to ensure an electronic design meets power, performance, or other requirements before tapeout, one or more signoff parasitic extraction modules to provide silicon-accurate interconnect parasitic extraction and ensure first-pass silicon success, and one or more power signoff modules to perform various power integrity analyses, transistor-level electromigration and IR-drop analyses, or other power and signal integrity analyses with SPICE-level accuracy or better accuracy with SPICE or SPICE-like simulations (e.g., Fast-SPICE, HSPICE, PSPICE, or any other SPICE-based or SPICE-compatible simulations) to ensure an electronic design meets or exceeds power, performance, and/or area goals in some embodiments.

The one or more signoff modules may include one or more physical verification modules (not shown) to perform various design rule checking, layout vs. schematic (LVS), etc. tasks to ensure that an electronic design meets or exceeds various spatial and other physical rules and one or more design for manufacturing (DFM) modules to address physical signoff and electrical variability optimization, correct lithography hotspots, predict silicon contours, improve yield, detect and repair timing and leakage hotspots to achieve variation- and manufacturing-aware signoff and design closure in some of these embodiments.

In addition or in the alternative, the one or more signoff modules may include one or more one or more computational lithography modules (not shown) to provide more accurate post-etch critical dimension accuracy and process windows on silicon, reticle and wafer synthesis, etc. to eliminate errors and/or reduce mask-manufacturing cycle times. One or more of these multi-fabric signoff modules may operate on the electronic design produced or modified with various techniques to be described in the following sections for proper signoff and design closure so that the signoff version of the electronic design may be properly manufactured with first-pass or fewer passes silicon success in some embodiments. In these embodiments, the signoff version of the electronic design produced or modified with various techniques described herein causes the underlying electronic circuit to be manufactured by a foundry or IC (integrated circuit) fabrication facility when the signoff version of the electronic design is forwarded to the foundry or IC fabrication facility that in turn fabricates the requisite photomasks and the eventual electronic circuit.

In some embodiments, the computing system 800 may include the various resources 828 such that these various resources may be invoked from within the computing system via a computer bus 880 (e.g., a data bus interfacing a microprocessor 892 and the non-transitory computer accessible storage medium 898 or a system bus 890 between a microprocessor 892 and one or more engines in the various resources 828). In some other embodiments, some or all of these various resources may be located remotely from the computing system 800 such that the computing system may access the some or all of these resources via a computer bus 880 and one or more network components.

The computing system may also include one or more modules in the set of modules 852. One or more modules in the set 852 may include or at least function in tandem with a microprocessor 892 via a computer bus 894 in some embodiments. In these embodiments, a single microprocessor 892 may be included in and thus shared among more than one module even when the computing system 800 includes only one microprocessor 892. A microprocessor 892 may further access some non-transitory memory 898 (e.g., random access memory or RAM) via a system bus 896 to read and/or write data during the microprocessor's execution of processes.

The one or more computing systems 800 may invoke and execute one or more modules in 828 and/or 852 to perform various functions. Each of these modules may be implemented as a pure hardware implementation (e.g., in the form of firmware, application specific IC, etc.), a pure software implementation, or a combination of hardware and software implementation. In some embodiments where a module is implemented at least partially as a software implementation, the module may be stored at least partially in memory (e.g., in random access memory, instruction cache, etc.) of at least one of these one or more computing systems 800 for execution.

System Architecture Overview

Figure 9:
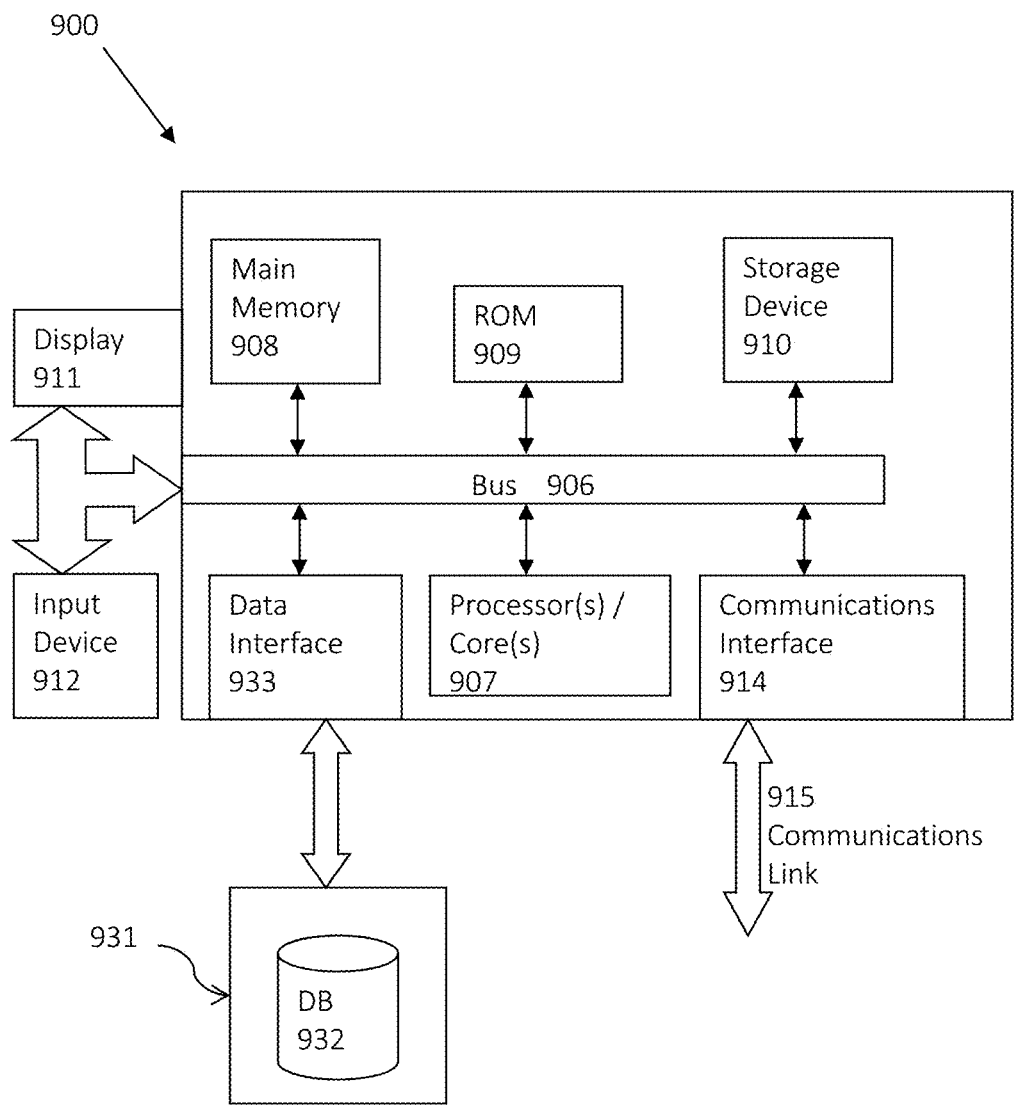
FIG. 9 illustrates a computerized system on which a method for characterizing electromigration effects in an electronic design may be implemented.

FIG. 9 illustrates a computerized system on which a method for characterizing electromigration effects in an electronic design may be implemented. Computer system 900 includes a bus 906 or other communication module for communicating information, which interconnects subsystems and devices, such as processor 907, system memory 908 (e.g., RAM), static storage device 909 (e.g., ROM), disk drive 910 (e.g., magnetic or optical), communication interface 914 (e.g., modem or Ethernet card), display 911 (e.g., CRT or LCD), input device 912 (e.g., keyboard), and cursor control (not shown). The illustrative computing system 900 may include an Internet-based computing platform providing a shared pool of configurable computer processing resources (e.g., computer networks, servers, storage, applications, services, etc.) and data to other computers and devices in a ubiquitous, on-demand basis via the Internet. For example, the computing system 900 may include or may be a part of a cloud computing platform in some embodiments.

According to one embodiment, computer system 900 performs specific operations by one or more processor or processor cores 907 executing one or more sequences of one or more instructions contained in system memory 908. Such instructions may be read into system memory 908 from another computer readable/usable storage medium, such as static storage device 909 or disk drive 910. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 907, where the one or more processors, one or more processor cores, or combination thereof executes one or more threads. For example, the acts of determination, extraction, stitching, simulating, annotating, analyzing, optimizing, and/or identifying, etc. may be performed by one or more processors, one or more processor cores, or combination thereof. In one embodiment, the parasitic extraction, current solving, current density computation and current or current density verification is done in memory as layout objects or nets are created or modified.

The term "computer readable storage medium" or "computer usable storage medium" as used herein refers to any non-transitory medium that participates in providing instructions to processor 907 for execution. Such a medium may take many forms, including but not limited to, non-volatile media and volatile media. Non-volatile media includes, for example, optical or magnetic disks, such as disk drive 910. Volatile media includes dynamic memory, such as system memory 908. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 900. According to other embodiments of the invention, two or more computer systems 900 coupled by communication link 915 (e.g., LAN, PTSN, or wireless network) may perform the sequence of instructions required to practice the invention in coordination with one another.

Computer system 900 may transmit and receive messages, data, and instructions, including program (e.g., application code) through communication link 915 and communication interface 914. Received program code may be executed by processor 907 as it is received, and/or stored in disk drive 910, or other non-volatile storage for later execution. In an embodiment, the computer system 900 operates in conjunction with a data storage system 931, e.g., a data storage system 931 that includes a database 932 that is readily accessible by the computer system 900. The computer system 900 communicates with the data storage system 931 through a data interface 933. A data interface 933, which is coupled to the bus 906 (e.g., memory bus, system bus, data bus, etc.), transmits and receives electrical, electromagnetic or optical signals that include data streams representing various types of signal information, e.g., instructions, messages and data. In embodiments of the invention, the functions of the data interface 933 may be performed by the communication interface 914.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

I claim:

1. A computer implemented method for characterizing electromigration effects in an electronic design, comprising:
    determining, by a microprocessor or a processor core, an electrical characteristic at a port of a portion of an electronic design;
    selecting a number of frequencies in a frequency domain for the electrical characteristic;
    determining multiple electric currents through a circuit component at least by:
        applying a voltage source corresponding to a frequency of the number of frequencies to at least the circuit component; and
        performing one or more analyses for the number of frequencies with an impedance replacing the circuit component that exhibits a time-dependent behavior in the electronic design and the voltage source for determining the multiple electric currents; and
    characterizing an electromigration effect for the circuit component using at least the multiple electric currents based at least in part upon the impedance.

2. The computer implemented method of claim 1, determining the electrical characteristic comprising:
   determining a network for the portion at least by performing an extraction on the port, wherein the port is located inside the electronic design but not at an external boundary of the electronic design.

3. The computer implemented method of claim 2, determining the electrical characteristic further comprising:
   generating a reduced network at least by applying a reduction technique to the network.

4. The computer implemented method of claim 2, determining the electrical characteristic further comprising:
   selecting a time window; and
   determining the electrical characteristic at least by performing an analysis on the network or a reduced network.

5. The computer implemented method of claim 1, selecting the number of frequencies comprising:
   determining the electrical characteristic in a frequency domain; and
   selecting the number of frequencies based at least in part upon a balancing criterion between performance and cost.

6. The computer implemented method of claim 1, determining the multiple electric currents comprising:
   applying a voltage source corresponding to a selected frequency in the number of frequencies to a network representing at least the portion of the electronic design; and
   determining an equivalent impedance for replacing the circuit component that exhibits a transient behavior.

7. The computer implemented method of claim 6, determining the multiple electric currents further comprising:
   generating a modified network for the network with at least the impedance; and
   generating the multiple electric currents at least by performing a first analysis of the one or more analyses on the modified network for the selected frequency, without requiring transient analyses.

8. The computer implemented method of claim 1, characterizing the electromigration effect comprising:
   identifying the multiple electric currents for the number of frequencies; and
   determining an aggregated current for the circuit component based at least in part upon some of the multiple currents for the number of frequencies.

9. The computer implemented method of claim 8, characterizing the electromigration effect further comprising:
   identifying a geometric characteristic of the circuit component; and
   determining an electromigration characteristic for the circuit component based at least in part upon the geometric characteristic and the aggregated current for the circuit component.

10. The computer implemented method of claim 9, characterizing the electromigration effect further comprising:
    characterizing the electromigration effect for the circuit component based at least in part upon the electromigration characteristic.

11. A system for characterizing electromigration effects in an electronic design, comprising:
    non-transitory computer accessible storage medium storing thereupon program code;
    a module stored at least partially in memory of and functioning in conjunction with at least one microprocessor or a processor core of a computing system, wherein the at least one microprocessor or the processor core of the computing system is configured to execute the module at least to:
    determine, by a microprocessor or a processor core, an electrical characteristic at a port of a portion of an electronic design;
    select a number of frequencies for the electrical characteristic in a frequency domain;
    determine multiple electric currents through a circuit component at least by:
       applying a voltage source corresponding to a frequency of the number of frequencies to at least the circuit component; and
       performing one or more analyses for the number of frequencies with an impedance replacing the circuit component that exhibits a time-dependent behavior in the electronic design and the voltage source for determining the multiple electric currents; and
    characterize an electromigration effect for the circuit component using at least the multiple electric currents based at least in part upon the impedance.

12. The system for claim 11, wherein the microprocessor or processor core that is configured to execute the module is further configured to:
    determine a network for the portion at least by performing an extraction on the portion of the electronic design;
    generate a reduced network at least by applying a reduction technique to the network;
    select a time window; and
    determine the electrical characteristic at least by performing an analysis on the network or a reduced network.

13. The system for claim 11, wherein the microprocessor or processor core that is configured to execute the module is further configured to:
    determine the electrical characteristic in a frequency domain; and
    select the number of frequencies based at least in part upon a balancing criterion between performance and cost.

14. The system for claim 11, wherein the microprocessor or processor core that is configured to execute the module is further configured to:
    apply a voltage source corresponding to a selected frequency in the number of frequencies to a network representing at least the portion of the electronic design;
    determine an equivalent impedance for replacing the circuit component that exhibits a transient behavior;
    generate a modified network for the network with at least the equivalent impedance; and
    generate the multiple electric currents at least by performing a first analysis of the one or more analyses on the modified network for the selected frequency, without requiring transient analyses.

15. The system for claim 14, wherein the at least one micro-processor that is configured to execute at least the one or more interference reduction modules is further configured to:
    identify the multiple electric currents for the number of frequencies;
    determine an aggregated current for the circuit component based at least in part upon some of the multiple currents for the number of frequencies;
    identify a geometric characteristic of the circuit component;

determine an electromigration characteristic for the circuit component based at least in part upon the geometric characteristic and the aggregated current for the circuit component; and characterize the electromigration effect for the circuit component based at least in part upon the electromigration characteristic.

16. An article of manufacture comprising a non-transitory computer accessible storage medium having stored thereupon a sequence of instructions which, when executed by at least one processor or at least one processor core executing one or more threads, causes the at least one microprocessor or the at least one processor core to perform a set of acts for characterizing electromigration effects in an electronic design, the set of acts comprising:

determining, by a microprocessor or a processor core, an electrical characteristic at a port of a portion of an electronic design;

selecting a number of frequencies for the electrical characteristic in a frequency domain;

determining multiple electric currents through a circuit component at least by:

applying a voltage source corresponding to a frequency of the number of frequencies to at least the circuit component; and performing one or more analyses for the number of frequencies with an impedance replacing the circuit component that exhibits a time-dependent behavior in the electronic design and the voltage source for determining the multiple electric currents; and characterizing an electromigration effect for the circuit component using at least the multiple electric currents and the impedance.

17. The article of manufacture of claim 16, wherein determining the characterization input comprises:

determining a network for the portion at least by performing an extraction on the portion of the electronic design;

generating a reduced network at least by applying a reduction technique to the network;

selecting a time window; and determining the electrical characteristic at least by performing an analysis on the network or a reduced network.

18. The article of manufacture of claim 16, the set of acts further comprising:

determining the electrical characteristic in a frequency domain; and selecting the number of frequencies based at least in part upon a balancing criterion between performance and cost.

19. The article of manufacture of claim 16, the set of acts further comprising:

applying a voltage source corresponding to a selected frequency in the number of frequencies to a network representing at least the portion of the electronic design;

determining an equivalent impedance for replacing the circuit component that exhibits a transient behavior;

generating a modified network for the network with at least the equivalent impedance; and generating the multiple electric currents at least by performing a first analysis of the one or more analyses on the modified network for the selected frequency, without requiring transient analyses.

20. The article of manufacture of claim 16, the set of acts further comprising:

identifying the multiple electric currents for the number of frequencies;

determining an aggregated current for the circuit component based at least in part upon some of the multiple currents for the number of frequencies;

identifying a geometric characteristic of the circuit component;

determining an electromigration characteristic for the circuit component based at least in part upon the geometric characteristic and the aggregated current for the circuit component; and characterizing the electromigration effect for the circuit component based at least in part upon the electromigration characteristic.

\* \* \* \* \*